US009118861B2

(12) United States Patent
Shibata

(10) Patent No.: US 9,118,861 B2
(45) Date of Patent: Aug. 25, 2015

(54) QUANTIZATION METHOD, IMAGE PROCESSING APPARATUS, AND RECORDING MEDIUM

(71) Applicant: FUJIFILM Corporation, Tokyo (JP)

(72) Inventor: Hiroyuki Shibata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/460,500

(22) Filed: Aug. 15, 2014

(65) Prior Publication Data

US 2015/0049366 A1 Feb. 19, 2015

(30) Foreign Application Priority Data

Aug. 19, 2013 (JP) ................................ 2013-169826

(51) Int. Cl.
*G06K 15/00* (2006.01)
*H04N 1/40* (2006.01)
*G06K 1/00* (2006.01)

(52) U.S. Cl.
CPC ...................................... *H04N 1/40* (2013.01)

(58) Field of Classification Search
None
See application file for complete search history.

(56) References Cited

U.S. PATENT DOCUMENTS

2004/0150841 A1\* 8/2004 Lieberman et al. ............. 358/1.2
2005/0195442 A1\* 9/2005 Inoue et al. .................. 358/3.14

FOREIGN PATENT DOCUMENTS

JP 4143560 B2 6/2008

OTHER PUBLICATIONS

Ulichney, Robert A.; "Dithering with blue noise"; Proceedings of the IEEE 76.1 (1988); pp. 56-79.

\* cited by examiner

*Primary Examiner* — Quang N Vo
(74) *Attorney, Agent, or Firm* — Studebaker & Brackett PC

(57) ABSTRACT

A quantization method according to an aspect of the present invention includes the steps of quantizing a first image data by the use of a basic pattern and converting the first image data into a second image data that represents a binary or multi-level quantized pattern having a gray level smaller than that of the first image data. The basic pattern according to this aspect of the present invention presents high frequent occurrence of the basic tone patterns and a mostly uniform-distributed pattern of the clusters of different kinds of the basic tone patterns in the image with the long-distance autocorrelation (periodicity) of the basic tone patterns suppressed. Quantization by the use of this basic pattern provides a quantized pattern that reflects pattern characteristics of the basic pattern.

13 Claims, 27 Drawing Sheets

PAPER FEEDING DIRECTION

PAPER FEEDING
DIRECTION

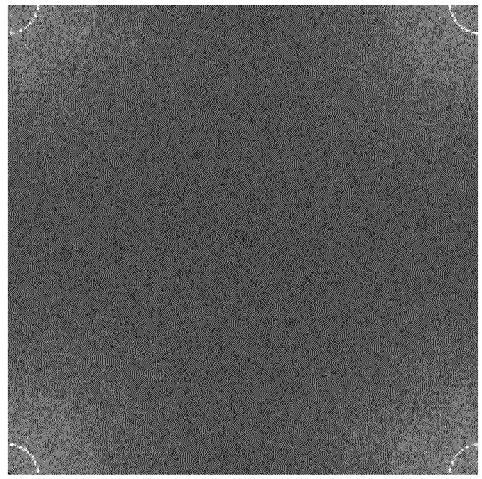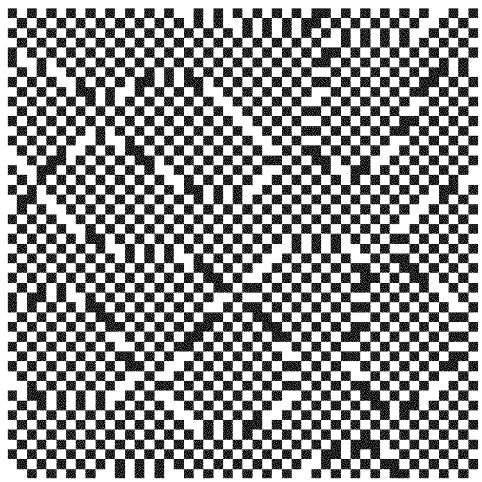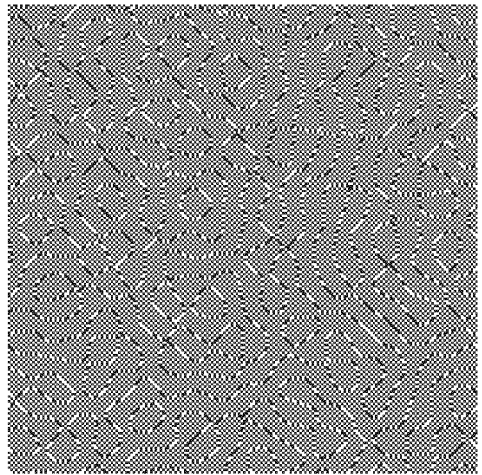

QUANTIZATION METHOD, IMAGE PROCESSING APPARATUS, AND RECORDING MEDIUM

CROSS-REFERENCE TO RELATED APPLICATIONS

The patent application claims priority under 35 U.S.C. §119 to Japanese Patent Application No. 2013-169826, filed on Aug. 19, 2013. Each of the above application(s) is hereby expressly incorporated by reference, in its entirety, into the present application.

BACKGROUND OF THE INVENTION

1. Field of the Invention

The present invention relates to a quantization method, an image processing apparatus, and a recording medium, and particularly to a quantization technique for converting a continuous-tone image into a binary or multi-level dot image.

2. Description of the Related Art

In the field of printing, a continuous-tone image of a printing subject (for example, an m-level image) is converted to a binary or multi-level dot image (an n-value image) by quantization processing such as dithering and an error diffusion method, where m and n are integers that satisfy $2 \leq n < m$. As a result, an image is formed in accordance with data on the obtained dot image, as is disclosed in Japanese Patent No. 4143560 and "Dithering with blue noise." by Ulichney, Robert A., Proceedings of the IEEE 76.1(1988): 56-79.

For example, in some inkjet recording apparatuses that form color images, the variety of ink colors is increased to expand the color reproduction region by adding light cyan (LC), light magenta (LM) and special colors to regular ink colors, i.e. cyan (C), magenta (M), yellow (Y), and black (Bk). While a method for increasing the number of ink color variations for use is effective in expanding the color reproduction region, it disadvantageously increases the cost of the apparatus.

SUMMARY OF THE INVENTION

Another method for expanding the color reproduction region uses a dot pattern for representing gray levels in which dots are, to the extent possible, arranged evenly without being overlapped one another in an image. This enables the color reproduction region to be expanded without an increase in ink color variation.

When it is supposed, for example, that dots can be printed on a square lattice corresponding to the pixel array of a two-dimensional image, the most ideal pattern among dot patterns with a record ratio of 50%, which is effective in a color reproduction region, is a checkered pattern having a dot arrangement in which a 2-pixel unit comprising dot-on (dot presence) and dot-off (dot absence) are alternately repeated in both the horizontal (x) and vertical (y) directions. Use of the checkered pattern for quantization enables a color reproduction region to be expanded.

Unfortunately, frequent use of checkered patterns in a dot image tends to produce artifacts due to the following facts.

Disadvantage 1: The boundaries of regions of checkered patterns having different phases are irregularly viewable.

Disadvantage 2: When a checkered pattern with high periodicity (long-distance autocorrelation) is used, interference between the printing operation of the inkjet head and the checkered pattern leads to an increased amount of ink discharge at an identical timing, thus generating an artifact owing to crosstalk (mutual fluidal interference through a channel in the head).

Disadvantage 3: When a checkered pattern with high periodicity is used, the checkered pattern can interfere with a mechanical vibration error in the inkjet recording apparatus (for example, mechanical vibration in a paper conveying system), causing artifacts to be noticeable.

A blue noise pattern can resolve the artifact disadvantages described above to some extent, as disclosed in "Dithering with blue noise." by Ulichney, Robert A., Proceedings of the IEEE 76.1(1988): 56-79. The blue noise pattern is a pattern having a spectrum in which white noise at a high frequency side and energy at a low frequency side are suppressed. Since the blue noise pattern has low periodicity on the checkered pattern part, the disadvantages 1 to 3 described above are restrained.

Unfortunately, the blue noise pattern leads to a relatively suppressed spectrum on the high frequency side, resulting in not-high frequent occurrence of checkered patterns that are helpful for expanding a color reproduction region. Thus, it is deficient in terms of color reproduction region. In other words, the conventional arts present a trade-off relationship between expanding the color reproduction region and reducing artifacts.

The disadvantages described above are not only relevant to inkjet recording apparatuses, but are understood as disadvantages common to various image forming apparatuses that use dot recording to represent gray levels.

It is an object of the present invention to provide a quantization method, an image processing apparatus, and a recording medium capable of creating a quantized pattern allowing both the expansion of a color reproduction region and the suppression of artifacts.

To resolve the disadvantages, the invention described below includes:

(First aspect): A quantization method according to a first aspect of the present invention includes the steps of quantizing a first image data by the use of a basic pattern and converting the first image data into a second image data that represents a binary or multi-level quantized pattern having a gray level smaller than that of the first image data. When each of basic tone frequencies is a local maximum of spatial frequency components in a pattern image that contains each of basic tone patterns repeatedly arranged as a repeating unit of a specific pattern in a two-dimensional dot arrangement, the basic pattern has spatial frequency characteristics in which components at and in the neighborhood of each basic tone frequency are relatively suppressed in comparison with other spatial frequency components in the pattern image, the local maximum exists in components at the outer periphery of each basic tone frequency outside the neighborhood of each basic tone frequency, and components at low frequencies are suppressed.

The basic pattern according to the first aspect of the present invention presents high frequent occurrence of the basic tone patterns and a mostly uniform-distributed pattern of the clusters of different kinds of the basic tone patterns in the image with the long-distance autocorrelation (periodicity) of the basic tone patterns suppressed. Quantization by the use of this basic pattern provides a quantized pattern that reflects pattern characteristics of the basic pattern.

The first image data is pre-quantization data such as continuous-tone image data of m gray levels. The second image data is an n-level quantized image obtained through quantization of the first image data, where m and n are integers that satisfy $2 \leq n < m$.

The quantization method according to the first aspect of the present invention provides a quantized pattern that has characteristics of the basic pattern, allowing both the expansion of a color reproduction region and the suppression of artifacts.

The basic pattern is defined as a pattern corresponding to certain gray levels (halftones as standard, e.g. a record ratio of 50%). In quantization processing, a dot arrangement for the basic pattern is implemented for gray levels corresponding to the basic pattern. The characteristics of the basic pattern are nearly kept in quantized patterns for other gray levels (halftones) created in accordance with the basic pattern.

The range of the "neighborhood" in the "neighborhood of a basic tone frequency" can be set to an appropriate range depending on the printing resolution and the like. As an example, with 1 pixel ([px]) in the case of a printing resolution of 1200 dpi taken as a unit, the range of a frequency difference approximately from $1/20$ [cycle/px] to $1/3$ [cycle/px] can be set to a range for the neighborhood.

The "low-frequency components" denote components at low frequency side that affect viewability with consideration given to frequency characteristics of the human eye. As a guideline, components in a low-frequency range of about 10 cycle/mm or below are equivalent to this.

The "use of a basic pattern" is not limited to the direct use of the dot arrangement of a basic pattern but includes modes where a basic pattern is indirectly used, such as in cases where quantization is processed through the use of a threshold matrix made based on a basic pattern.

(Second aspect): In the quantization method according to the first aspect of the present invention, the basic pattern is created through the steps of: making a first pattern in which components in the neighborhood of each of the basic tone frequencies are relatively suppressed in comparison with other components and the local maximum of components exists at the outer periphery of each basic tone frequency; and suppressing lower frequency components than those of the first pattern while maintaining pattern characteristics of the neighborhood and the outer periphery of each basic tone frequency in the first pattern.

A method for creating the basic pattern is composed of a process which includes the steps of: making a first pattern in which components in the neighborhood of each of the basic tone frequencies are relatively suppressed in comparison with other components and the local maximum of components exists at the outer periphery of each basic tone frequency; and suppressing lower frequency components than those of the first pattern while maintaining pattern characteristics of the neighborhood and the outer periphery of each basic tone frequency in the first pattern.

(Third aspect): In the quantization method according to the second aspect of the present invention, the step of making the first pattern includes the step of making a division pattern divided into N different regions (N: 2 or greater). The division pattern has pattern characteristics in which, out of spatial frequency components, low-frequency components lower than a first frequency Fmin and high-frequency components higher than a second frequency Fmax which is higher than the first frequency Fmin are suppressed. The step of making the first pattern further includes the step of performing convolution of the respective N regions in the division pattern with N different basic tone patterns having identical densities per unit area and having a difference in at least one of phase and basic tone frequency, one to the other. The step of suppressing lower frequency components than those of the first pattern includes the step of converting the first pattern made in the convolution step into a second pattern in which respective basic tone frequency components and respective low-frequency components in the N different basic tone patterns are suppressed.

(Fourth aspect): In the quantization method according to the third aspect of the present invention, the step of making a division pattern includes the steps of: applying a band-pass filter for suppressing low-frequency components lower than the first frequency Fmin and high-frequency components higher than the second frequency Fmax to a white noise pattern; and applying N−1 threshold levels to a pattern resulting from the application of the band-pass filter so as to divide the pattern into the N regions.

(Fifth aspect): In the quantization method according to any one of the second to fourth aspects of the present invention, the step of suppressing lower frequency components than those of the first pattern includes the steps of: performing filter processing on a pattern; and performing an exchange between relatively high density dots and relatively low density non-dots in the pattern. The filter processing uses a filter that highlights low-frequency components and components in the neighborhood of each basic tone frequency in comparison with other components in the pattern.

(Sixth aspect): In the quantization method according to any one of the second to fourth aspects of the present invention, the step of suppressing lower frequency components than those of the first pattern is a step for extracting boundary regions including the boundaries of the N regions from the first pattern and changing the arrangement of dots only in the boundary regions.

Correcting the dot arrangement only within the boundary regions enables the suppression of low-frequency components while maintaining pattern characteristics in the neighborhood of each of the basic tone frequencies.

(Seventh aspect): In the quantization method according to any one of the first to sixth aspects of the present invention, the basic pattern has a record ratio of 50%.

It is preferable that the basic pattern should have a record ratio of 50% which produces the most profound effect on the expansion of the color reproduction region in the pattern. The record ratio, however, is not limited to 50% in applying the invention. It may be around 50% of halftone. The allowable range of around 50% is, for example, 50%±about 10%.

(Eighth aspect): In the quantization method according to any one of the first to seventh aspects of the present invention, the quantization is processed by the use of a threshold matrix created based on the basic pattern.

(Ninth aspect): In the quantization method according to any one of the first to eighth aspects of the present invention, the quantization is processed by an error diffusion method through the use of the basic pattern as a constraint for dot arrangement.

A mode of jointly using the threshold matrix described in the eighth aspect and the error diffusion method described in the ninth aspect for quantization can be employed.

(Tenth aspect): An image processing apparatus according to a tenth aspect of the present invention includes: an image input part that captures a first image data; and a quantization processing part for quantizing the first image data and converting the first image data into a second image data that represents a binary or multi-level quantized pattern having a gray level smaller than that of the first image data. The quantization processing part quantizes the first image data by the use of a basic pattern to convert the first image data into the second image data. When each of basic tone frequencies is a local maximum of spatial frequency components in a pattern image that contains each of basic tone patterns repeatedly arranged as a repeating unit of a specific pattern in a two-dimensional dot arrangement, the basic pattern has spatial frequency characteristics in which components at and in the neighborhood of each basic tone frequency are relatively suppressed in comparison with other spatial frequency components in the pattern image, the local maximum exists in components at the outer periphery of each basic tone frequency outside the neighborhood of each basic tone frequency, and components at low frequencies are suppressed.

The image processing apparatus according to the tenth aspect of the present invention quantizes a pre-quantization first image data to convert the image data into a post-quantization second image data (quantized pattern). Quantized patterns obtained by an image processing apparatus of this mode present high frequent occurrence of the basic tone patterns and a mostly uniform-distributed pattern of the clusters of different kinds of the basic tone patterns in the image, allowing both the expansion of the color reproduction region and the suppression of artifacts.

The image processing apparatus according to the tenth aspect of the present invention can be appropriately combined with particulars similar to those on the "basic pattern" described in the second to seventh aspects.

(Eleventh aspect): The image processing apparatus according to the tenth aspect of the present invention further includes a threshold matrix storing part that stores a threshold matrix created based on the basic pattern. The quantization processing part processes quantization by the use of the threshold matrix.

(Twelfth aspect): The image processing apparatus according to either the tenth aspect or the eleventh aspect of the present invention further includes a basic pattern storing part that stores the basic pattern. The quantization processing part processes quantization by an error diffusion method through the use of the basic pattern as a constraint for dot arrangement.

(Thirteenth aspect): A non-transitory recording medium according to a thirteenth aspect of the present invention stores computer-readable code of a program which causes a computer to perform the quantization method according to any one of the first to the ninth aspect.

According to the present invention, a high-quality, favorable dot image can be created, allowing both the expansion of the color reproduction region and the suppression of artifacts.

BRIEF DESCRIPTION OF THE DRAWINGS

FIGS. 13A, 13B and 13C are an example of a first pattern created by processing in steps A-1 and A-2, an enlarged view of a part of an upper left region of FIG. 13A, and a diagram illustrating frequency characteristics (two-dimensional spatial frequency spectrum) of the pattern of FIG. 13A, respectively;

DETAILED DESCRIPTION OF THE PREFERRED EMBODIMENTS

Embodiments of the present invention will now be described in detail with reference to the attached drawings.

<Organizing Disadvantages and Description of Solution Principles>

To make explanation simple in this description, let "checkered patterns" be taken as an example of basic tone patterns which have spatial periodicity and produce effect on the expansion of a color reproduction region. As described earlier, disadvantages associated with high frequent use of checkered patterns in an image are artifacts. When the disadvantages 1 to 3 described earlier are perceived as disadvantages and countermeasures against them in a pattern of dot arrangement, they are organized as follows:

Disadvantage A: The disadvantage 1 can be perceived that as the boundaries (or clusters) of distributed checkered patterns have low-frequency components, the boundaries (contours of clusters) are visually identified with ease.

Countermeasure A: As a countermeasure against the disadvantage A, spatial frequency components in the boundaries (or clusters) of checkered patterns need to be suppressed.

Disadvantage B: The disadvantages 2 and 3 can be perceived that the increased frequency of occurrence of checkered patterns causes the periodicity to be facilitated, thus generating artifacts in a wide area.

The "facilitated periodicity" means that the long-distance autocorrelation of the pattern is enhanced. In other words, increasing the frequency of occurrence of checkered patterns facilitates the long-distance autocorrelation of the pattern. When an error factor (e.g. mechanical vibration in an apparatus and crosstalk associated with simultaneous discharge by a plurality of nozzles of an inkjet head) observed in a long-distance range occurs, artifacts occur in a wide area.

Countermeasure B: As a countermeasure against the disadvantage B, the periodicity (long-distance autocorrelation) of the pattern or the boundaries of checkered patterns (or clusters of checkered patterns) needs to be suppressed.

In other words, the disadvantages A and B can be resolved by controlling the boundaries of checkered patterns (or clusters of checkered patterns) (countermeasures A, B) in addition to suppressing low-frequency components in the pattern, which is generally required, in quantization for converting a continuous-tone image to a dot pattern image.

<Phases of Checkered Patterns>

Figure 1:
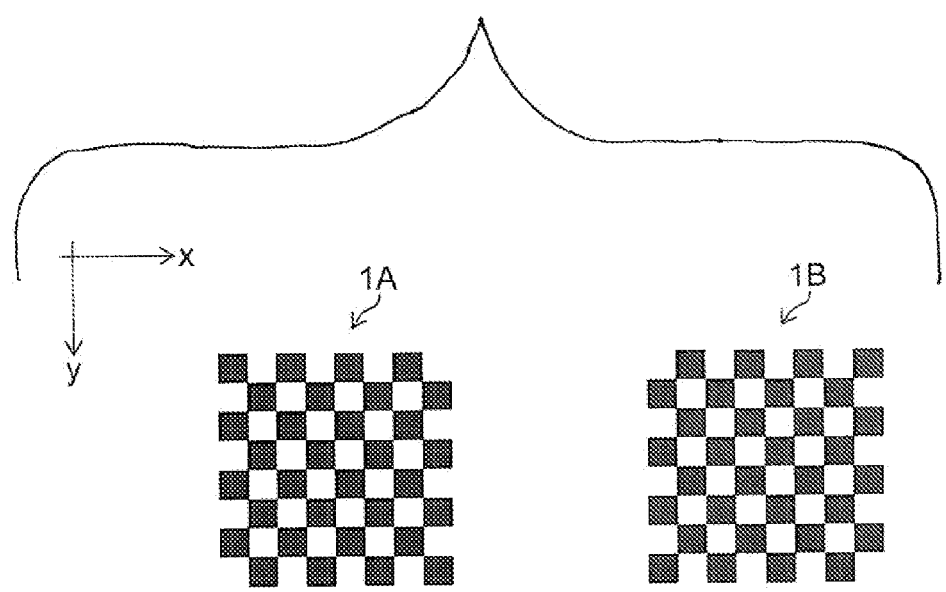
FIG. 1 illustrates checkered patterns having different phases.

FIG. 1 illustrates checkered patterns having different phases. The checkered pattern is a pattern in which dot-on (dot presence) and dot-off (dot absence) are alternately repeated in both the horizontal (x) and vertical (y) directions of a two-dimensional image lattice.

In FIG. 1, each cell of an image lattice represented by a square lattice corresponds to a "pixel", and a white pixel represents a non-printing pixel (dot absence) and a black pixel represents a printing pixel (dot presence) where a dot is placed. In some cases, a white colored image portion (pixel) without dot (off) is called an "off portion" and a black colored image portion (pixel) with dot (on) is called an "on portion".

Each of checkered patterns 1A, 1B in FIG. 1 is a pattern with a record ratio of 50%. The record ratio is the percentage of the number of printing pixels (dots) with respect to the total number of pixels per unit area. The record ratio 100% means that a dot is placed (recorded) on every pixel and the record ratio 50% means that dots are placed on n/2 pixels in n pixels. FIG. 1 exemplifies an image area of 8 by 8 pixels and a dot is placed on each of 32 pixels in 64 pixels (the number of printing dots is 32). Although FIG. 1 shows an area of 8 by 8 pixels, a basic minimum repeating unit for the checkered patterns 1A, 1B is 2 by 2 pixels.

White (off) portions and black (on) portions shown in the checkered pattern 1A on the left-hand side of FIG. 1 are inversely arranged in the checkered pattern 1B on the right-hand side, and thus their phases of spatial repetition cycles of dot presence/absence are different. The checkered pattern includes two patterns having different phases as designated by reference characters 1A and 1B.

For the convenience of description, this specification calls the checkered pattern 1A on the left of FIG. 1 as the checkered pattern with the "phase 0" and the checkered pattern 1B on the right of FIG. 1 as the checkered pattern with the "phase 1".

Preferred Pattern Example

Figure 2:
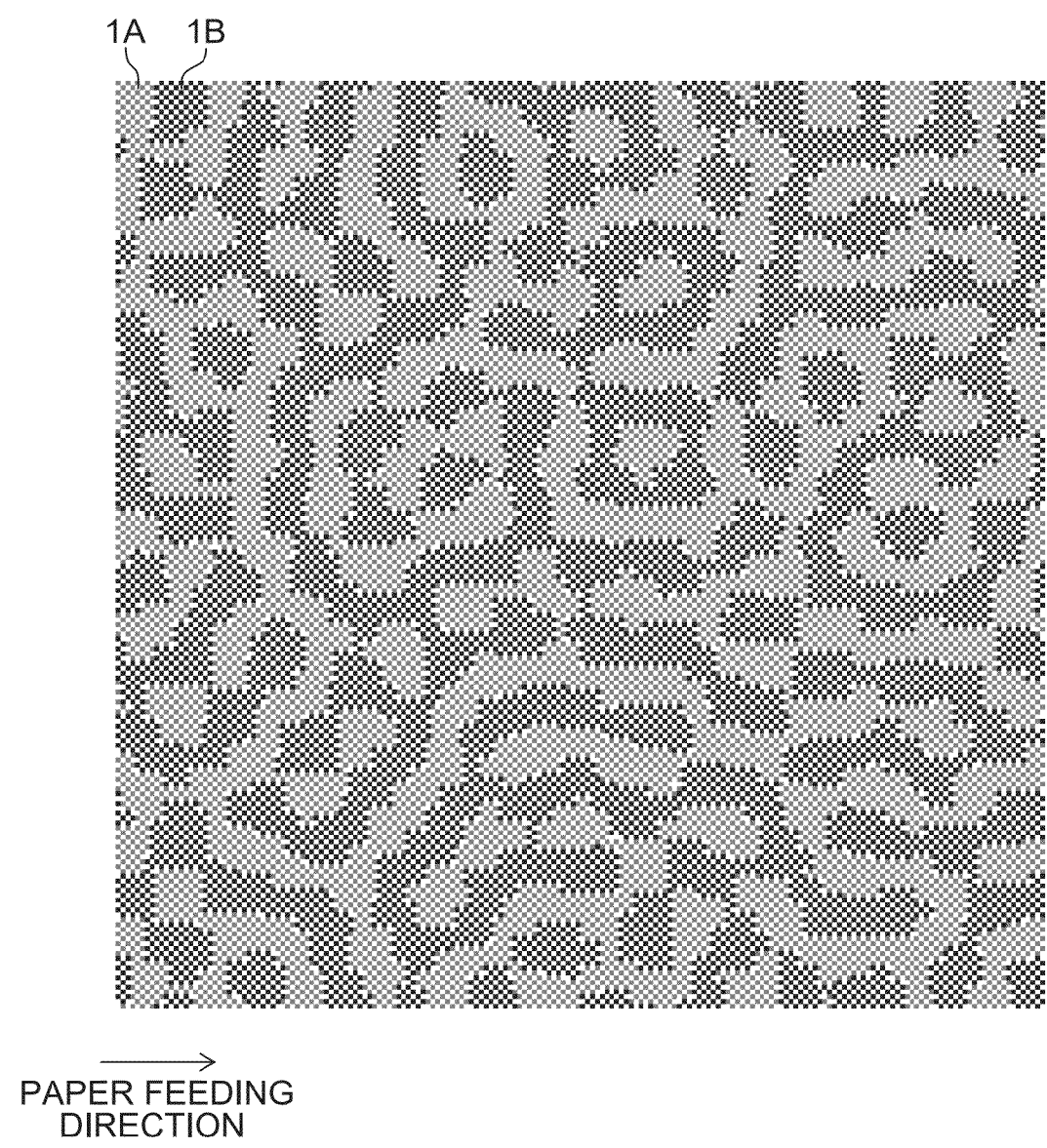
FIG. 2 illustrates an example of a preferable pattern created in accordance with an embodiment of the present invention.
Figure 3:
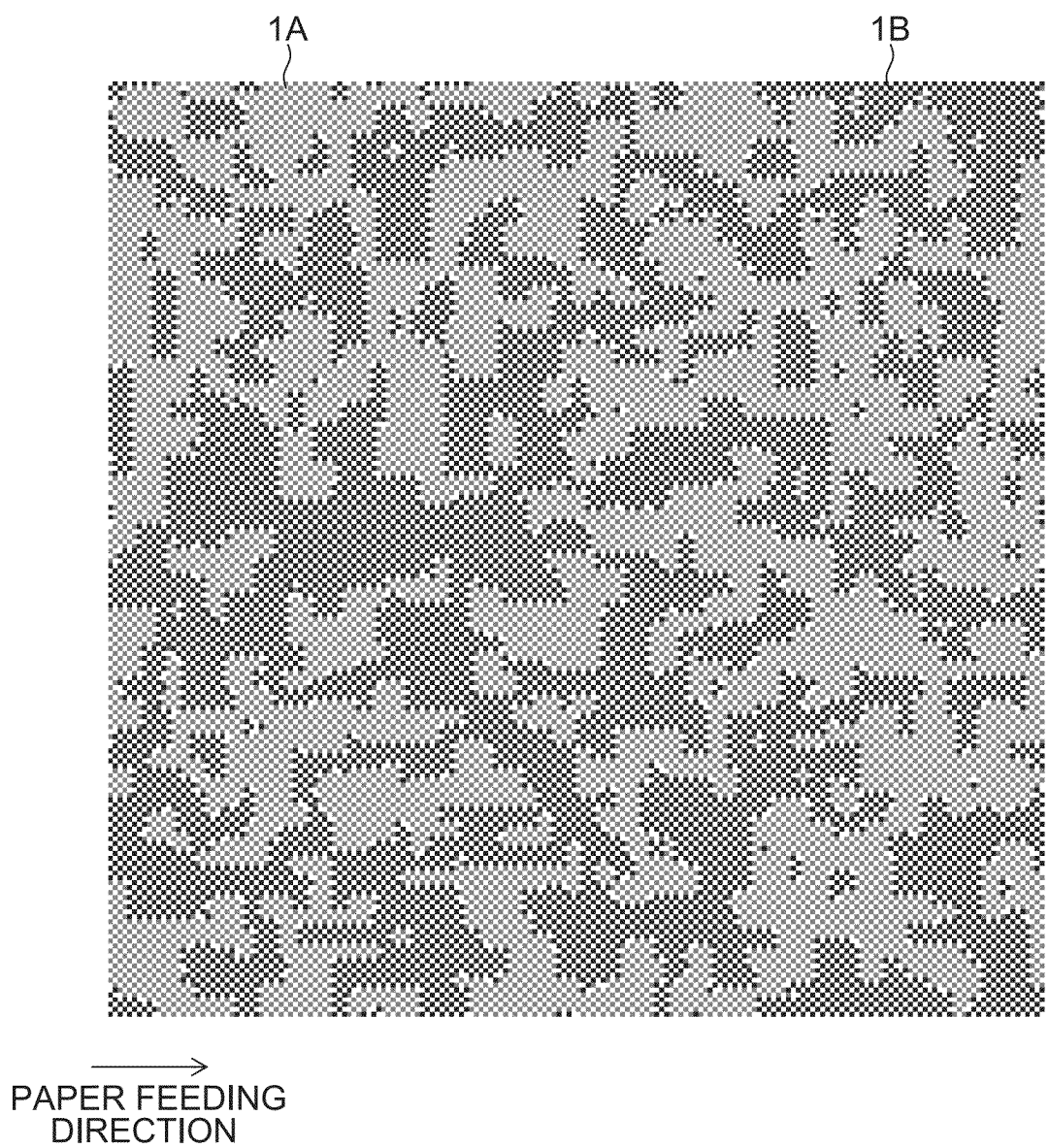
FIG. 3 illustrates an example of a pattern to show unresolved disadvantages in comparison.

FIG. 2 illustrates an example of a preferable dot pattern created in accordance with the embodiment. The dot pattern shown here has a record ratio of 50%. FIG. 3, on the other hand, illustrates an example of a pattern with the disadvantages A, B unresolved for the sake of comparison.

In FIGS. 2 and 3, the checkered patterns 1A, 1B having different phases described in FIG. 1 are presented with the lightness of respective colors, gray and black, for the convenience of description. In FIGS. 2 and 3, every region with the pattern having dot-on portions presented in gray corresponds to the checkered pattern 1A with "phase 0" in FIG. 1 and every region with the pattern having dot-on portions presented in black corresponds to the checkered pattern 1B with "phase 1" in FIG. 1.

A pattern, if it is divided into regions according to a distinction in the phase of each checkered pattern, presents the pattern as shown in FIG. 2 or 3. For the convenience of description, this specification calls a closed region that consists of checkered patterns with an identical phase as a "cluster of the checkered pattern" and the boundary (outline) of the clusters of the checkered patterns as a "boundary of the checkered pattern".

The dot pattern of FIG. 2 according to the embodiment presents suppressed low-frequency components in the pattern, high frequent occurrence of the checkered patterns 1A, 1B and a mostly uniform mixture of the two checkered patterns having different phases.

In contrast, the dot pattern shown in FIG. 3 as a comparative example presents an uneven mixture of the checkered patterns having different phases as compared with that of FIG. 2 although it presents suppressed frequency components in the pattern and high frequent occurrence of the checkered patterns.

<Frequency Characteristics of Pattern>

When the boundaries and clusters of the checkered patterns as shown in FIG. 2 are represented by spatial frequency characteristics, these are equivalent to components near the basic tone frequency component of the checkered patterns (dashed-line circles 5A, 5B, 5C, 5D of FIG. 4) and the volume of the "components near the basic tone frequency component" is equivalent to the frequency of occurrence of the checkered patterns.

Figure 4:
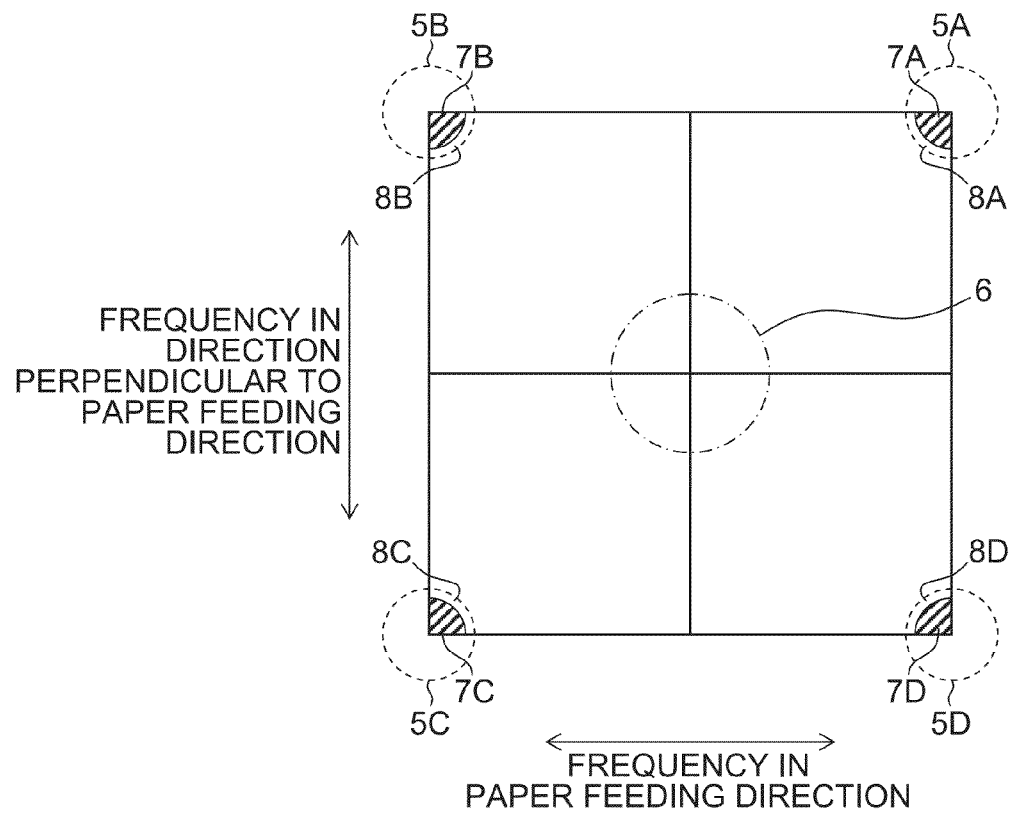
FIG. 4 is a schematic diagram illustrating frequency characteristics (two-dimensional spatial frequency spectrum) of a preferable pattern.

FIG. 4 is a schematic diagram illustrating frequency characteristics (two-dimensional spatial frequency spectrum). In FIG. 4, the horizontal axis represents frequency in a paper feeding direction and the vertical axis represents frequency in a direction perpendicular to the paper feeding direction. The inner area of the dashed-line circle 6 (inside the circle) with its center at the origin point of FIG. 4 corresponds to low frequency components of the pattern.

The four corners of FIG. 4, i.e. the centers of the dashed-line circles 5A to 5D are equivalent to the basic tone frequency (½ [cycle/px]) of the checkered patterns. As described in the explanation of FIG. 1, the shortest spatial period of the checkered patterns 1A, 1B is 1 period per 2 pixels ([px]), i.e. the frequency is ½=0.5 [cycle/px]. This is the largest frequency and equivalent to a "basic tone frequency".

Areas 7A to 7D around the centers in the respective dashed-line circles 5A to 5D correspond to low-frequency components of the clusters of the checkered patterns. The areas 7A to 7D around the centers in the respective dashed-line circles 5A to 5D and components of the outer peripheries, that is areas 8A to 8D around the dashed lines correspond to the frequency of occurrence of the checkered patterns.

Thus, suppressing the areas 7A to 7D around the centers in the dashed-line circles 5A to 5D (low-frequency components of the clusters of the checkered patterns) and increasing the components of the areas 8A to 8D around the dashed lines of the dashed-line circles 5A to 5D by increasing the frequency of occurrence of the checkered patterns and further suppressing the inner area of the dashed-line circle 6 of FIG. 4 (low frequency components in the pattern) provide a solution to the disadvantages A, B.

Each of the areas 7A to 7D around the centers in the dashed-line circles 5A to 5D includes the basic tone frequency and constitutes a neighborhood closest to the basic tone frequency (the most immediate neighborhood of basic tone frequency) and thus corresponds to a "neighborhood of basic tone frequency". Each of the components of the areas 8A to 8D around the dashed lines of the dashed-line circles 5A to 5D corresponds to an "outer periphery of basic tone frequency outside the neighborhood of the basic tone frequency".

Figure 5:
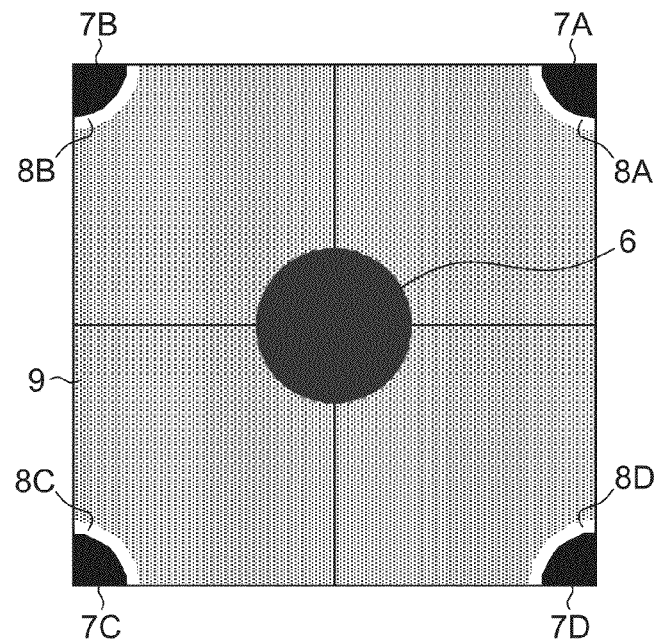
FIG. 5 is a schematic diagram of ideal (desirable) spatial frequency characteristics.

FIG. 5 is a schematic diagram of ideal (desirable) spatial frequency characteristics. In FIG. 5, component amounts are represented by density (brightness), thus a brighter portion (higher intensity) has a larger component amount and a darker portion (lower intensity) has a smaller component amount. Black represents no component value ("component=0") and white represents an adequately large value (near the local maximum).

In a desirable spatial frequency spectrum as shown in FIG. 5, low-frequency components in the pattern (components in an area inside the circle designated by reference numeral 6) and low-frequency components of the clusters of the checkered patterns (components in the areas around the four corners designated by reference numerals 7A to 7D, referred to as "neighborhood of basic tone frequency") are relatively suppressed as compared with other components and the frequency of occurrence of the checkered patterns (components in the areas designated by reference numerals 8A to 8D, referred to as "outer periphery of basic tone frequency" or in the areas designated by reference numerals 7A to 7D, "neighborhood of basic tone frequency") is increased, that is, components in the outer peripheries of each basic tone frequency have the local maximum. Preferably, a component amount in a shaded area 9 of FIG. 5 be close to "0" (none) although it is arbitrary to some extent.

Figure 6:
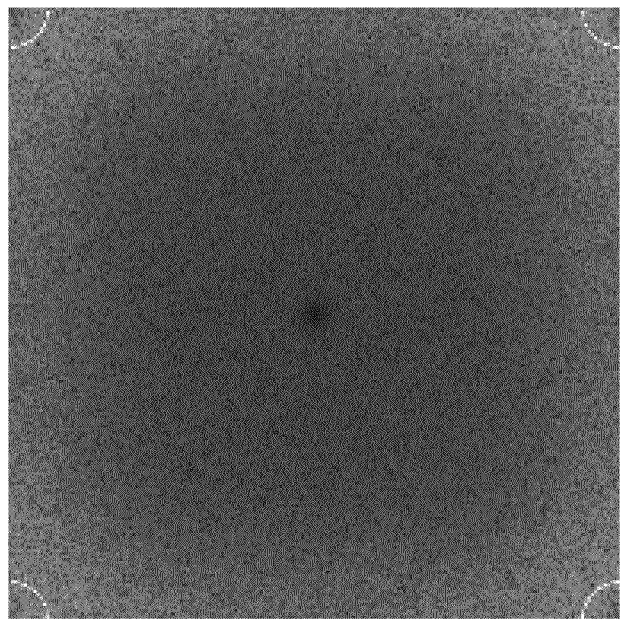
FIG. 6 illustrates spatial frequency characteristics of a pattern obtained in accordance with an embodiment of the present invention.
Figure 7:
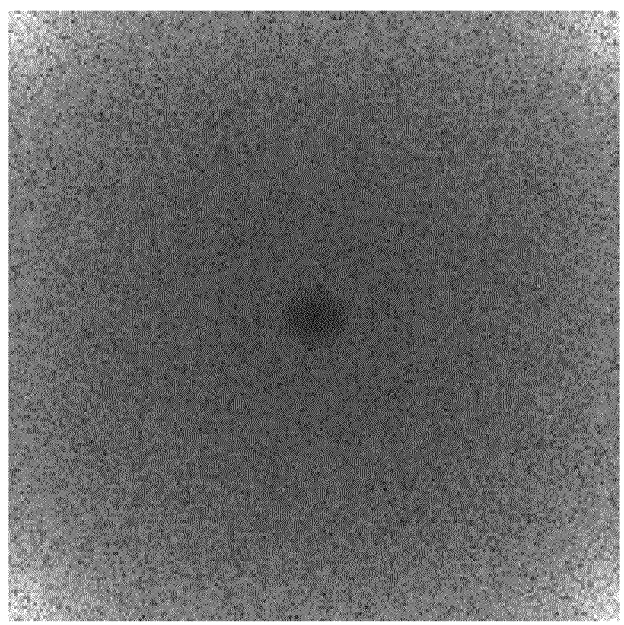
FIG. 7 illustrates spatial frequency characteristics of a pattern in accordance with the comparative example.

FIG. 6 illustrates spatial frequency characteristics of a pattern obtained in accordance with the embodiment. FIG. 6 shows a two-dimensional spatial frequency spectrum of the pattern shown in FIG. 2 and the component amounts are represented by density. Rules for density display are the same as in FIG. 5. FIG. 7 illustrates spatial frequency characteristics of a pattern in accordance with the comparative example. FIG. 7 shows a two-dimensional spatial frequency spectrum of the pattern exemplified in FIG. 3.

Frequency characteristics of the pattern shown in FIG. 6 according to the embodiment meet the conditions of characteristics described in FIG. 5. Frequency characteristics of the pattern shown in FIG. 7 according to the comparative example, on the other hand, do not meet the conditions because components in each area closest to the basic tone frequency (the areas designated by reference numerals 7A to 7D described in FIG. 5) are not suppressed although they present a high frequency of occurrence of the checkered patterns due to high intensity in the neighborhood of each basic tone frequency. This results in an uneven distribution of the clusters of the checkered patterns (refer to FIG. 3) and provides no solution to the disadvantages A, B. In other words, artifacts occur despite favorable color reproducibility.

<Method of Creating Pattern>

This specification calls a pattern having the desirable frequency characteristics described in FIGS. 5 and 6 as a "basic pattern". A method for creating the basic pattern will now be described.

Figure 8:
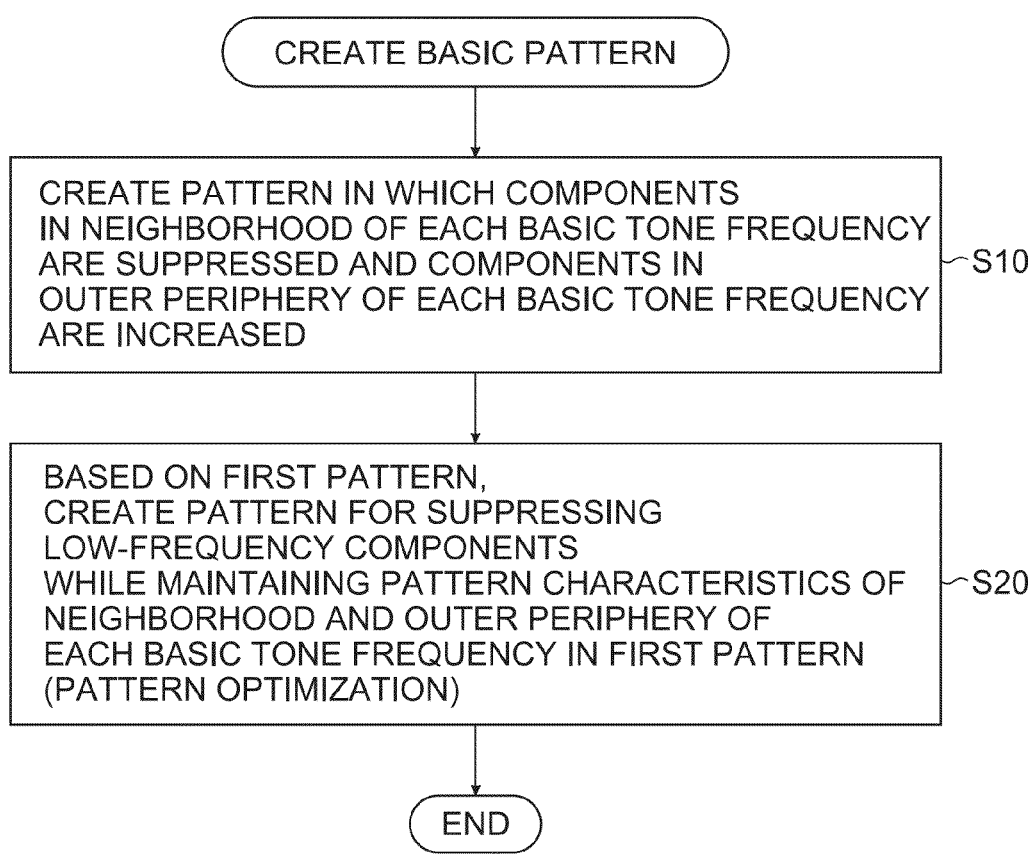
FIG. 8 is a flowchart showing a method of creating a basic pattern in accordance with an embodiment of the present invention.

FIG. 8 is a flowchart showing a method of creating a basic pattern in accordance with the embodiment. The method of creating a basic pattern according to the embodiment includes the following processes (process A and process B).

(Process A) Process for creating a pattern ("first pattern") in which components in the neighborhood of each basic tone frequency out of spatial frequency components in the pattern are suppressed and the frequency of occurrence (i.e. intensity of components) in the periphery (outer periphery of each basic tone frequency) is increased (step S10 in FIG. 8).

In other words, the process A is a process for creating the characteristics of four corners in the desirable frequency characteristics diagram described in FIG. 5.

(Process B) Process for suppressing low-frequency components while maintaining characteristics obtained in the step A (step S10 in FIG. 8) described above (step S20 in FIG. 8).

In other words, the process B is a process for creating the characteristics of the neighborhood of the original point (central portion) in the desirable frequency characteristics diagram described in FIG. 5.

Through the use of a basic pattern created in the processes A and B (steps S10, S20 in FIG. 8) for quantization processing, a dot image that enables both the expansion of the color reproduction region and the suppression of artifacts can be obtained.

The process A and the process B will now be described in further detail.

<<Process a (Step S10 in FIG. 8)>>

A first pattern in which components in the neighborhood of each basic tone frequency are suppressed and the frequency of occurrence in the outer periphery of each basic tone frequency is increased can be created in the following process.

(Process A-1) A pattern where low-frequency components and high-frequency components are suppressed is converted by N-value processing so as to divide the pattern into N regions, where N is the number of phase types (the number of phases) of the basic tone pattern for use and represents an integer of 2 or greater. When the two checkered patterns 1A, 1B having different phases described in FIG. 1 are used, the number of phases N of the basic tone pattern for use is 2.

"A pattern where low-frequency components and high-frequency components are suppressed" is a dot pattern having mainly green noise characteristics (band-pass characteristics).

To take a concrete example, let us perform a convolution of a band-pass filter (filter where low-frequency components and high-frequency components are suppressed) with a white noise pattern and apply N−1 threshold levels to the pattern to divide it to N regions. To use the two checkered patterns 1A, 1B having different phases (FIG. 1), apply 1 threshold level to the pattern to divide it to 2 regions.

A white noise pattern can be created by specifying a size of the pattern and generating pseudo-random numbers.

white noise (WN)=rand (pattern size)
band-pass filter example (BPF(f));
If(BPFmin<f (=frequency)<BPFmax) then, BPF(f)=1; else, BPF(f)=0; end Note that the cluster size of the checkered pattern depends on BPFmin and BPFmax.

Although optimum values for BPFmin and BPFmax differ depending on printing resolution, meeting, for example, the following conditions is appropriate.

Fmax<⅓ cycle/px
1/20<Fmin<⅓ cycle/px

That is to say, setting the values so that the cluster size of the checkered patterns become larger than 3 px and up to about 20 px is proper.

The following equation can be used for convolution operation.

$$d(x)=ifft(fft(WN)BPF(f));$$

where fft represents a fast Fourier transform function.
ifft represents an inverse fast Fourier transform function.
Division into N regions (exemplified in the case of N=2) through comparison with threshold levels can be performed by the following computation.
N (N=2) regions division pattern D(x):
If(d(x)>th) then, D(x)=1; else D(x)=0; end
where "th" represents a threshold level.

Thus, a pattern D(x) that is divided into regions by 2 values ("0" or "1") is obtained.

Figure 9:
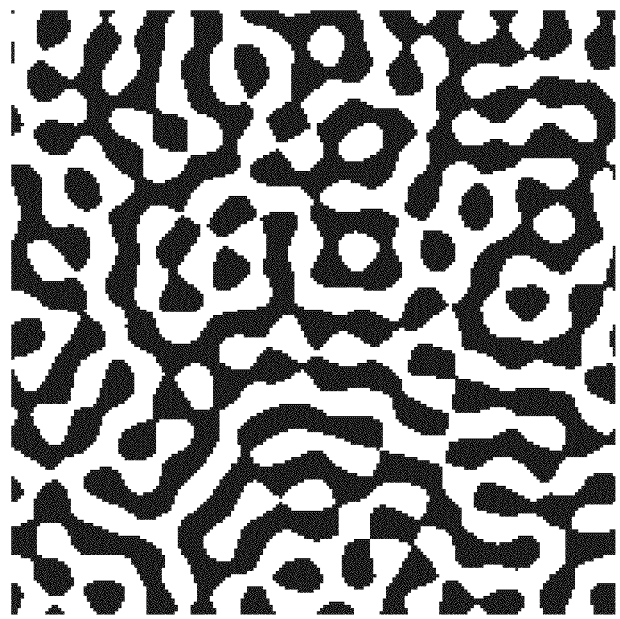
FIG. 9 illustrates an example of a pattern D(x) divided in N (N=2) regions.
Figure 10:
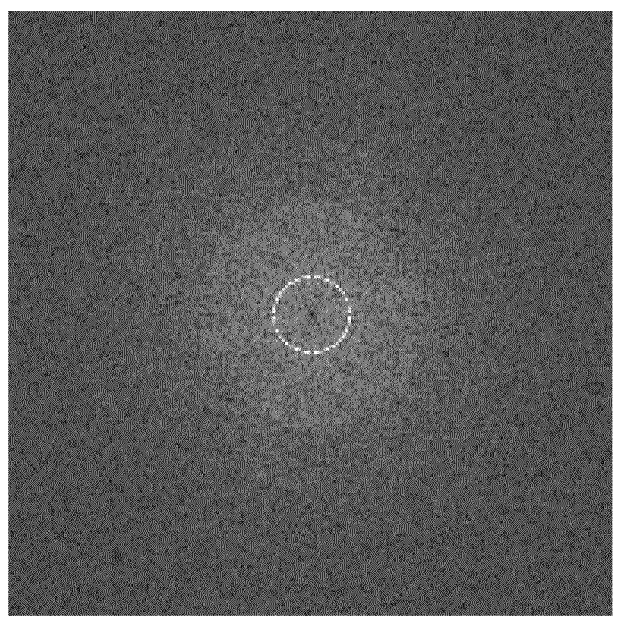
FIG. 10 illustrates spatial frequency characteristics of the pattern D(x) divided in N regions.

FIG. 9 illustrates an example of a pattern D(x) divided into N (N=2) regions and FIG. 10 shows frequency characteristics of the pattern D(x).

Figure 11:
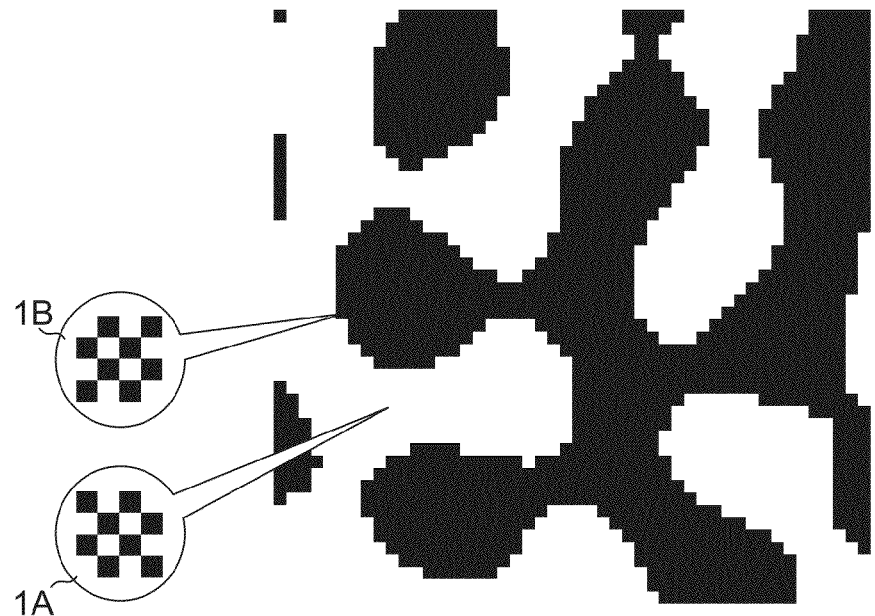
FIG. 11 is an enlarged view of a part of upper left regions in FIG. 9.

(Process A-2) Process for embedding basic tone patterns having same characteristics and different phases (the two checkered patterns 1A, 1B shown in FIG. 1 in this example) in respective regions in the N-regions division pattern D(x) (refer to FIG. 11).

Let us call the checkered pattern 1A of FIG. 1 as a checkered pattern with the "phase 0" and the checkered pattern 1B as a checkered pattern with the "phase 1" and then classify the N (N=2) regions-division pattern D(x) shown in FIG. 9 into white and black regions so as to perform a process of embedding (convolution) the checkered patterns 1A with the "phase 0" in the white regions and the checkered patterns 1B with the "phase 1" in the black regions.

FIG. 11 is an enlarged view of a part of upper left regions in FIG. 9. In FIG. 11, the checkered patterns 1A with the "phase 0" are embedded in the white regions and the checkered patterns 1B with the "phase 1" are embedded in the black regions. Thus, a first pattern is created.

Figure 12:
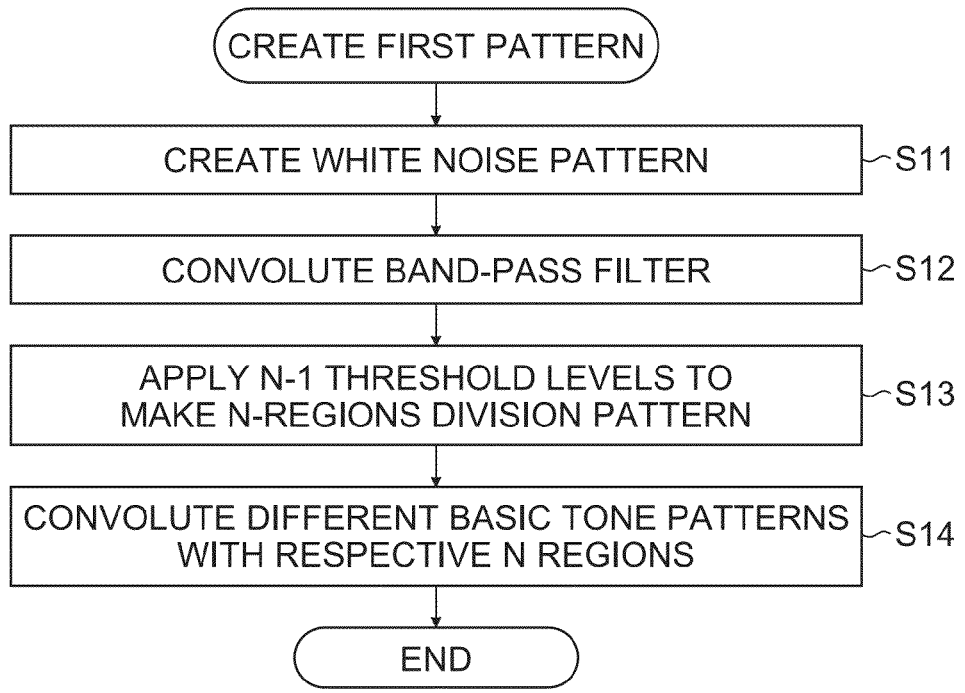
FIG. 12 is a flowchart showing an organized process for creating a first pattern.

FIG. 12 is a flowchart showing an organized process for creating a first pattern in the processes A-1 and A-2 described above. As shown in FIG. 12, the process of creating a first pattern includes creating a white noise pattern (step S11), performing convolution of a band-pass filter (step S12) so as to create a green noise pattern where low-frequency components and high-frequency components are suppressed and applying N−1 threshold levels to the green noise pattern to create a pattern divided into N regions (step S13, refer to FIG. 9).

The process further includes performing convolution of different basic tone patterns with respective N regions in the obtained N-regions division pattern (step S14 of FIG. 12, refer to FIG. 11).

The steps S11 to S13 in FIG. 12 correspond to the "process A-1" and the step S14 of FIG. 12 corresponds to the "process A-2".

FIG. 13A is an example of a first pattern created by processing in the "process A-1" and the "process A-2" and FIG. 13B is an enlarged view of a part of upper left regions in FIG. 13A. FIG. 13C shows frequency characteristics (two-dimensional spatial frequency spectrum) of the pattern shown in FIG. 13A.

As shown in FIGS. 13A to 13C, the first pattern created through the "process A-1" and the "process A-2" represents a pattern in which the neighborhood of each basic tone frequency is suppressed and the frequency of occurrence in the outer periphery of each basic tone frequency is increased. The pattern, however, shows inadequate suppression of low-frequency components as compared with the desirable pattern (FIG. 2 and FIG. 6). Accordingly, a process for decreasing low-frequency components is carried out in the following process B.

<<Process B (Step S20 in FIG. 8)>>

The process B (step S20 in FIG. 8) is a process for pattern optimization of decreasing low-frequency components while maintaining characteristics of the neighborhood and the outer periphery of each basic tone frequency, which is obtained in the process A-2 described above.

Figure 14C:
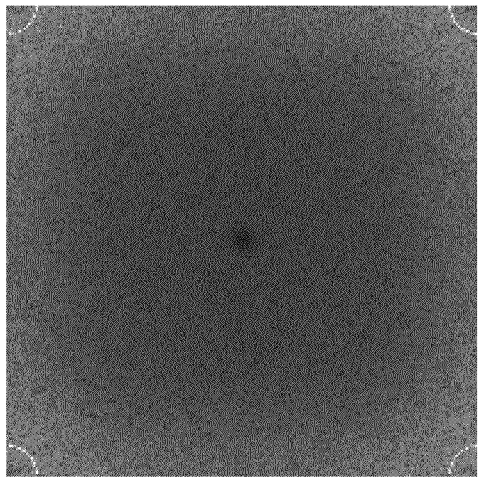
FIGS. 14A, 14B and 14C are an example of a pattern (equivalent to a basic pattern) ultimately created by processing in a process B, an enlarged view of a part of an upper left region of FIG. 14A, and a diagram illustrating frequency characteristics (two-dimensional spatial frequency spectrum) of the pattern of FIG. 14A, respectively.
Figure 14B:
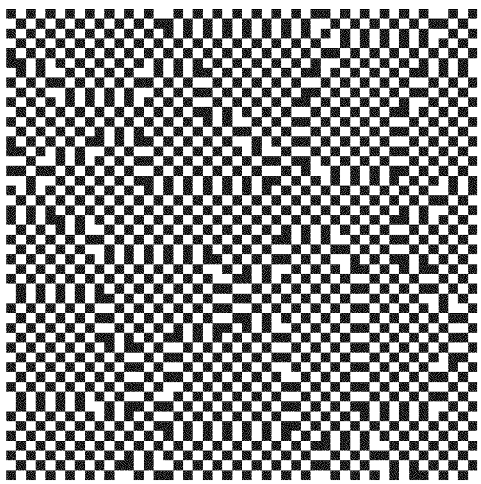
Figure 14A:
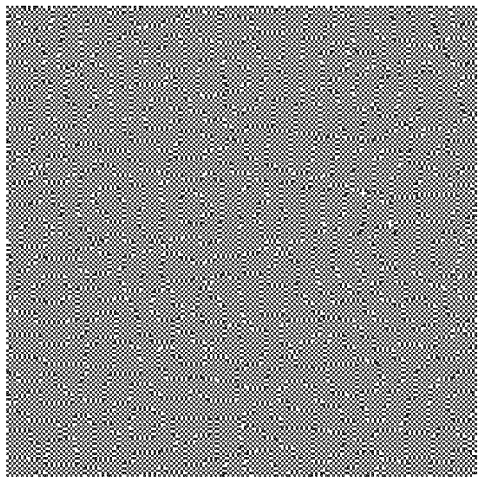

A result of the process will now be described in advance. FIG. 14A is an example of a pattern (equivalent to a basic pattern) ultimately created by processing in the process B and FIG. 14B is an enlarged view of a part of upper left regions in FIG. 14A. FIG. 14C shows frequency characteristics (two-dimensional spatial frequency spectrum) of the pattern shown in FIG. 14A. FIG. 14A is on a par with the pattern shown in FIG. 2. Frequency characteristics of FIG. 14C are equivalent to those of FIG. 6 and meet the conditions of ideal frequency characteristics described in FIG. 5.

Examples of the specific process of the process B will now be described.

Example 1

Frequency Control Method

Figure 15:
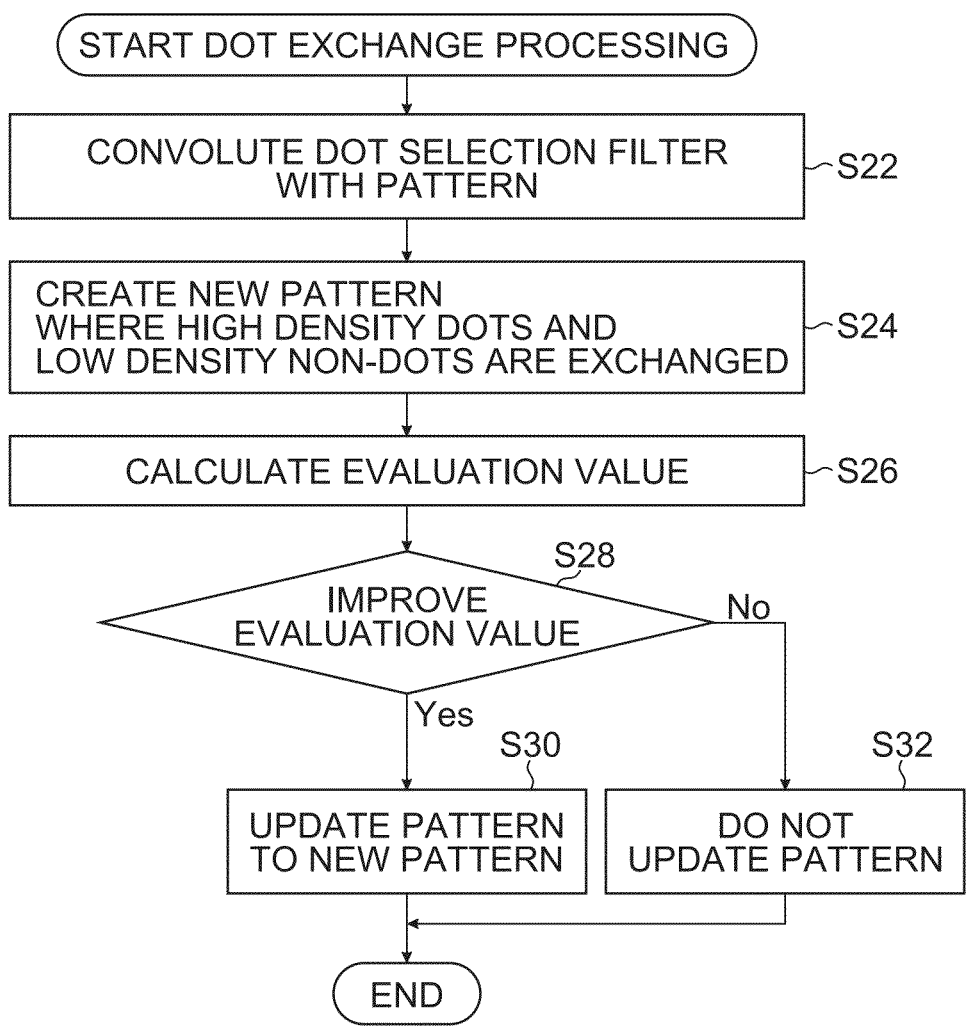
FIG. 15 is a flowchart showing an example of dot exchange processing applied in an example 1.

The method of example 1 used for the process B employs pattern optimization of decreasing low-frequency components while maintaining pattern characteristics of the neighborhood and the outer periphery of each basic tone frequency by repeating dot exchange processing shown in the flowchart of FIG. 15 for a predetermined number of times. Upon the start of dot exchange processing shown in FIG. 15, convolution of a dot selection filter with the first pattern obtained in the process A-2 is performed (step S22).

The dot selection filter is a filter created to highlight low-frequency components and components in the neighborhood of a basic tone frequency in a pattern. An example of creating a dot selection filter will be described below. The filter is created by multiplying a filter for highlighting low-frequency components (FL), a filter for highlighting components in the neighborhood of a basic tone frequency (FS) and a transition filter (FT) having a gradient from low frequency to a basic tone frequency.

Figure 16:
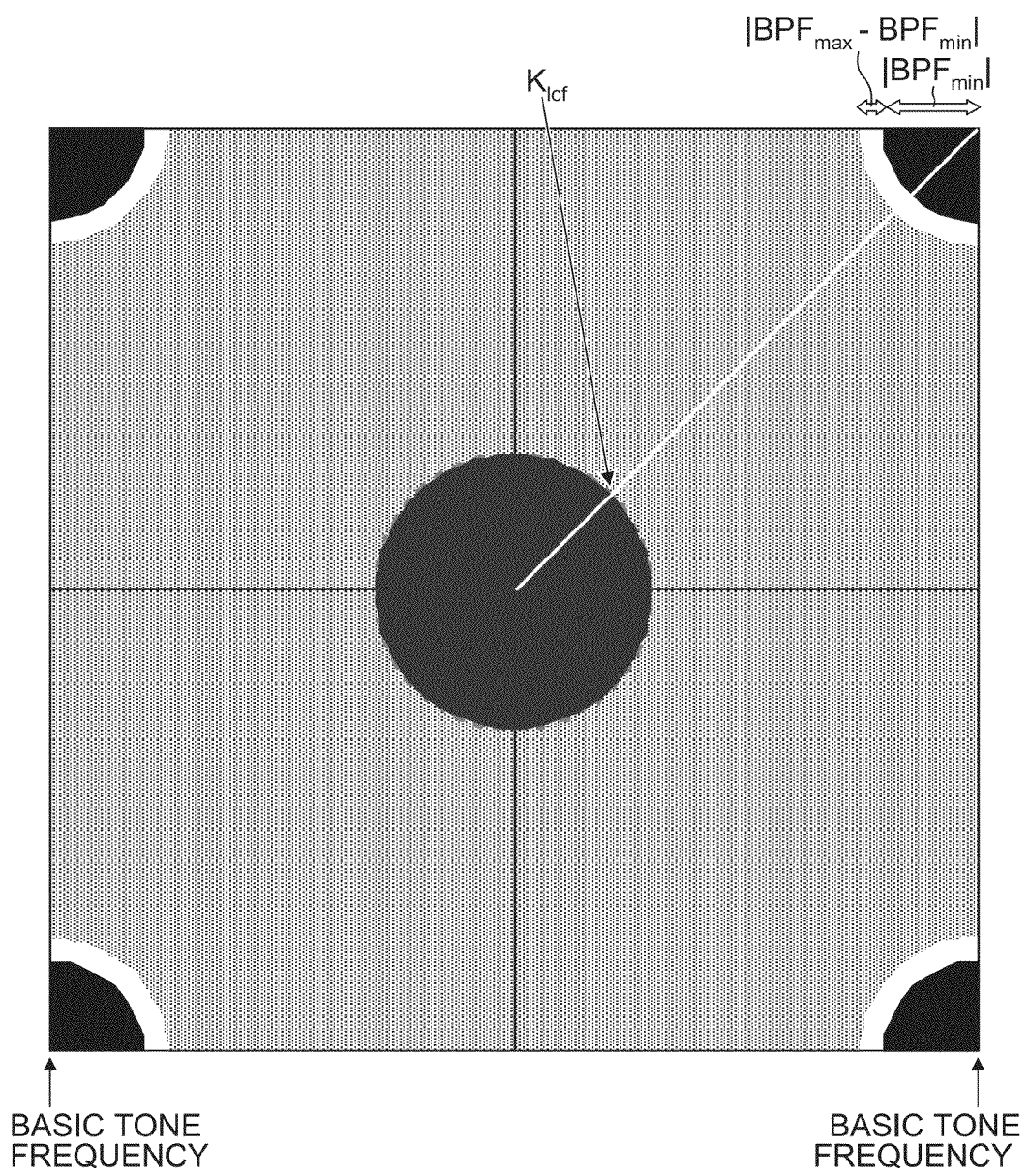
FIG. 16 is an explanatory drawing of frequency characteristics of a dot selection filter.
Figure 17:
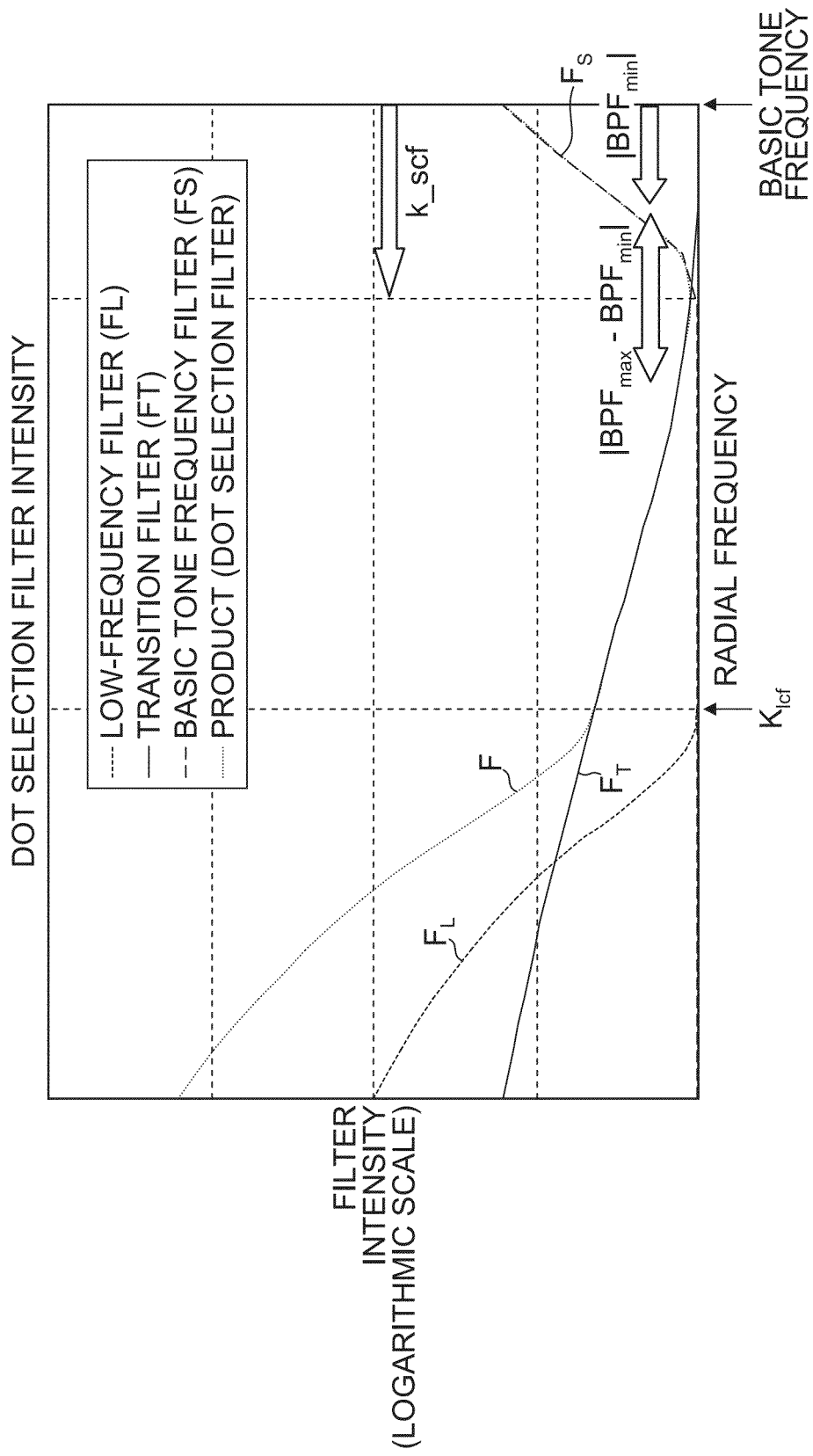
FIG. 17 is a graph showing filter intensity of a dot selection filter in a radial direction.

FIG. 16 is an explanatory drawing (two-dimensional) of frequency characteristics of a dot selection filter. FIG. 17 shows filter intensity (cross section of the white straight line of FIG. 16) of a dot selection filter in a radial direction from the original point to the upper right corner (the direction of the white straight line of FIG. 16) in a two-dimensional frequency space of FIG. 16. In FIG. 17, the horizontal axis presents frequency in a radial direction (expressed as "radial frequency") and the vertical axis presents filter intensity in a logarithmic scale.

As shown in FIG. 17, the dot selection filter F is the product of the low-frequency filter FL, the basic tone frequency filter FS and the transition filter FT.

The low-frequency filter is intended for differentiation of components visually identified, thus it is preferable that the filter highlight components at frequencies smaller than or equal to a cut-off frequency which depends on visibility. A filter formulated by, for example, the following expression 1 can be used for the filter that highlights low-frequency components (low-frequency filter FL).

$$F_L(k) = (L_0 - 1)\left(1 - \frac{k}{k_{lcf}}\right)^n \theta(k_{lcf} - k) + 1 \quad \text{[Expression 1]}$$

Where the frequency k in a radial direction satisfies k≥0, the cut-off frequency klcf for low-frequency components is roughly determined by human visibility, and θ(x) is a step function.

The fitting parameters Lo and n can take on any real numbers although it is preferable that Lo>1 and n≥2 are satisfied, respectively.

A filter formulated by, for example, the following expression 2 can be used for the filter that highlights components in the neighborhood of each basic tone frequency (basic tone frequency filter FS).

$$F_S(k) = \prod_s \left[(L_s - 1)\left(1 - \frac{|k_s - k|}{k_{scf}}\right)^{n_s} \theta(k_{scf} - |k_s - k|) + 1\right] \quad \text{[Expression 2]}$$

Where the direct product of s which indicates a plurality of basic tone frequencies is worked out.

It is preferable that the cut-off frequency kscl of the periphery of components at each basic tone frequency be smaller than or equal to the frequency of the band-pass filter described above.

The following filter obtained by computing the Fourier transform of a Point Spread Function (PSF) which corresponds to a filter with the inverse of a checkered pattern is used for the transition filter FT when checkered patterns, for example, are employed.

Figures 18, 19:
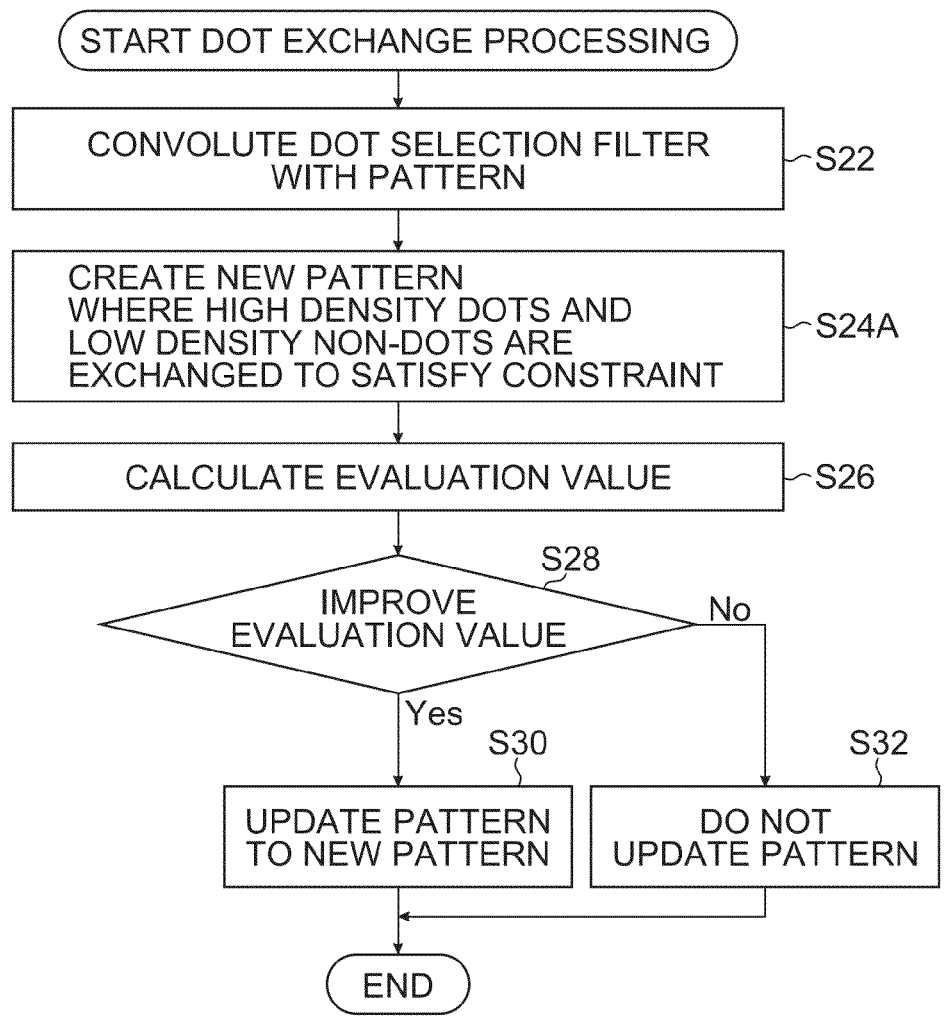
FIG. 18 shows a concrete example of a Point Spread Function (PSF) filter.
FIG. 19 is a flowchart showing dot exchange processing applied in an example 2.

FT=abs(fft(PSF))

where PSF is, for example, one shown in FIG. 18.

Such a transition filter FT causes components suppressed by the low-frequency filter FL to transition to band components (|BPFmax−BPFmin| width component) at the periphery of components at each basic tone frequency.

The dot selection filter F is the product of these three different filters (FL, FS, and FT) and formulated by the following expression.

$$F(k)=F_L(k)F_S(k)F_T(k) \quad \text{[Expression 3]}$$

Performing convolution of the dot selection filter F with a pattern created in the "process A" provides highlighted low-frequency components and highlighted basic tone value components (components at each basic tone frequency and in the neighborhood thereof expressed as "basic tone value components") in the pattern.

Now, let us proceed to step S24 in the flowchart of FIG. 15.

In the step S24, dot exchange processing in relation to density is performed. That is, in the pattern obtained by computing the convolution of the dot selection filter in the step S22, high density dots and low density non-dots are exchanged (step S24). Such processing creates a new pattern in which dot arrangement is changed, which, in many cases, allows low-frequency components and basic tone value components to be suppressed. This new pattern is equivalent to a "second pattern".

Next, an evaluation value on the new pattern created in the step S24 is calculated (step S26). The dot exchange processing of the step S24 does not always result in the suppression of low-frequency components and basic tone value components although they do in many cases. Thus, the step S26 provides calculation of an evaluation value to check the effect of suppressing low-frequency components and basic tone value components by the dot exchange processing (step S24).

This evaluation value uses an index correlated with "decreasing low-frequency components while maintaining characteristics, obtained in the process A, of the neighborhood of each basic tone frequency". For example, perform convolution of the dot selection filter described in FIG. 17 with the pattern obtained in the step S24 and a standard deviation of density levels in the pattern (the following [Expression 4]), as one example, can be used for the evaluation value.

$$\text{Eval}=\text{stdev}[\text{iff}(F(k)\text{fft}(\text{img}))] \quad \text{[Expression 4]}$$

Where Eval is an evaluation function for defining an evaluation value and the stdev function determines a standard deviation of a population.

Following the calculation of an evaluation value in the step S26, the process determines whether or not the evaluation value has been improved (step S28). If the evaluation value shows improvement (smaller value) after the exchange of dots in the step S24 as compared with that of the pre-exchange, the process determines that there is an improvement.

In the case of confirming an improvement in the step S28, the pattern (dot arrangement) is updated to the new pattern obtained in the step S24 (step S30).

If no improvement is confirmed in the step S28, the pattern is not updated (step S32).

Repeating the process of FIG. 15 enables the updating of the pattern with a further improved evaluation value and consequently the pattern to be optimized Example 2

Boundary Region Optimization Method

In the example 1, the dot selection filter includes a basic tone frequency filter so as to suppress components at each basic tone frequency. The example 2 achieves the suppression of components at each basic tone frequency by putting a constraint in the process of exchanging dots in a real space.

FIG. 19 is a flowchart showing dot exchange processing applied in the example 2. In the flowchart of FIG. 19, a step identical or similar to that of the flowchart in FIG. 15 is assigned with the same step number of FIG. 15. As shown in FIG. 19, the flow of the basic process is similar to that of FIG. 15 (Example 1).

The filter formulated by the expression 3 may be used for a dot selection filter applied in the step S22 of FIG. 19 as in FIG. 15 (Example 1). It is, however, preferable that the example 2 use the following expression 5 because components at basic tone frequencies are suppressed in a real space.

$$F(k)=F_L(k)F_T(k) \quad \text{[Expression 5]}$$

In the step S24A of FIG. 19, a "constraint" is placed in the exchange of dots, and a new pattern where high density dots and low density non-dots are exchanged is created so as to satisfy the constraint. In this method, a constraint involving the suppression of components at basic tone frequencies is added.

Specifically, in a real space, the clusters of checkered pattern show the most noticeable pattern characteristics of components at basic tone frequencies. Thus, dot exchange processing is performed as in the step S24 of FIG. 15 (Example 1) under a constraint that "dot arrangement should not be changed inside the boundaries of clusters of checkered patterns but changed only on the boundaries" so as to create a new pattern in which low-frequency components are decreased while the suppression of components at basic tone frequencies are maintained (step S24A of FIG. 19).

Figure 20:
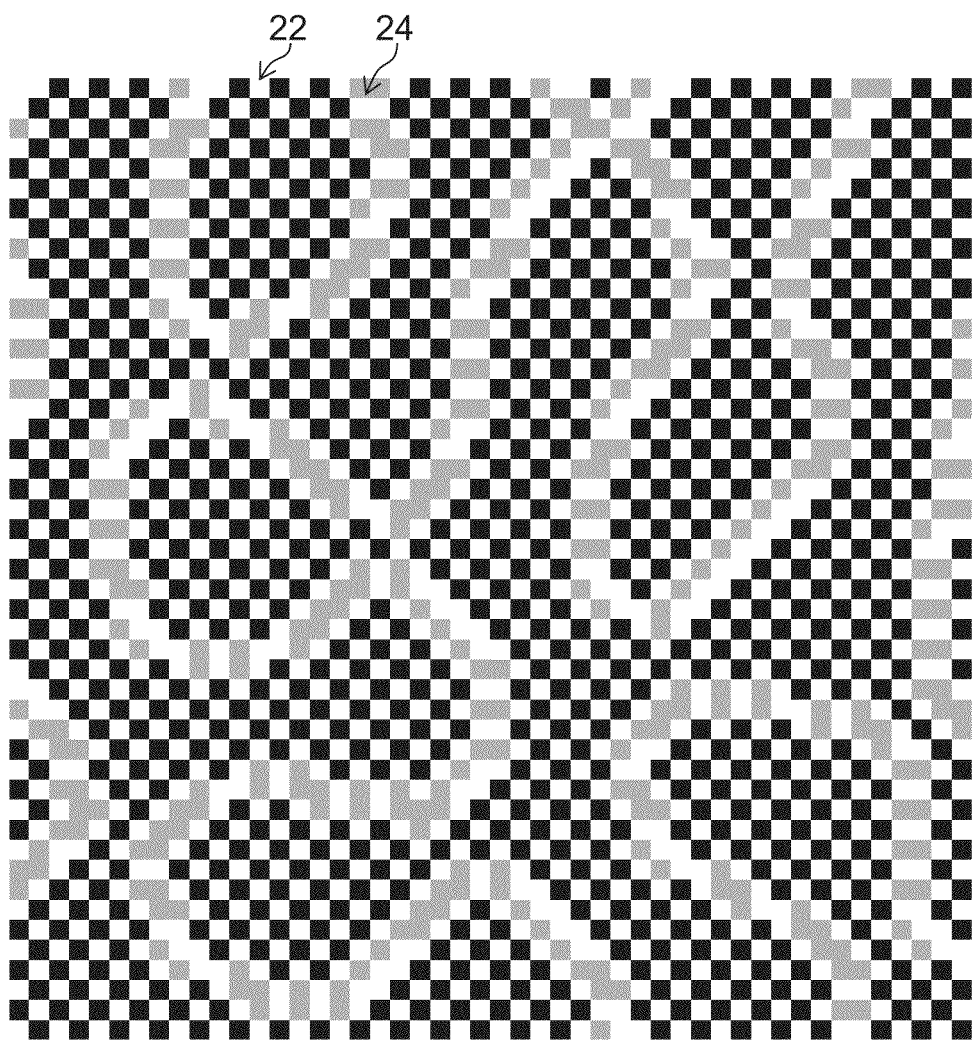
FIG. 20 is an enlarged view illustrating clusters of checkered patterns and their boundaries in an easy-to-understand manner.

FIG. 20 is an enlarged view of clusters of checkered patterns and their boundaries in a first pattern, illustrated in an easy-to-understand manner. In FIG. 20, pattern regions shown in black represent checkered pattern clusters 22 and regions shown in gray represent boundaries 24 of the checkered pattern clusters 22.

With reference to FIG. 20, under the constraint that pixel regions (boundary regions) including the boundaries 24 shown in gray are extracted from the first pattern and dots are exchanged only in the boundary regions (gray), a new pattern is created (step S24A of FIG. 19).

Subsequent processing for calculating an evaluation value (step S26), determining improvement in the evaluation value (step S28), updating the pattern based on the determination (step S30) or not updating (step S32) is in like manner with that of the example 1 (FIG. 15).

Processing in the process B as exemplified in FIGS. 15 and 20 causes dot arrangement in the first pattern to be corrected, providing a basic pattern having target frequency characteristics (FIG. 6).

Figure 21:
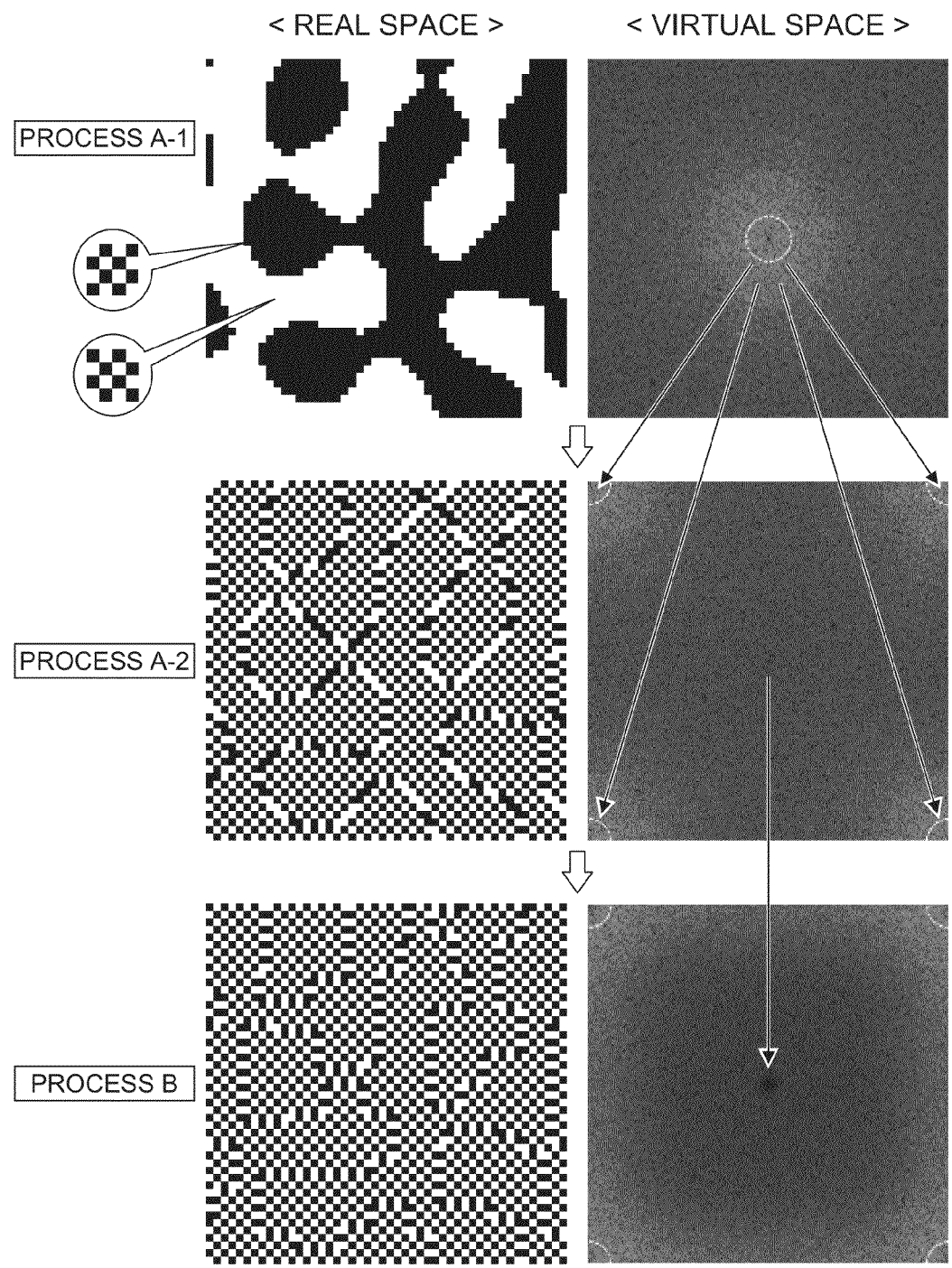
FIG. 21 is a diagram showing an organized overview of a method for creating a pattern in accordance with an embodiment of the present invention.

FIG. 21 shows diagrams illustrating an organized arrangement of patterns in a "real space" and intensity patterns in a "virtual space" (frequency space) to summarize the processing from (process A-1) through (process A-2) to (process B) detailed in FIGS. 8 to 20.

In FIG. 21, patterns obtained in (process A-1), patterns obtained in (process A-2) and patterns obtained in (process B) are shown in the upper row, middle-row, and lower-row, respectively. Patterns in a real space are shown on the left-hand side of FIG. 21 and the intensity distribution in a "virtual space" (frequency space) is shown on the right-hand side. In FIG. 21, the diagram on the left in the upper row, the diagram on the right in the upper row, the diagram on the left in the middle row, the diagram on the right in the middle row, the diagram on the left in the lower row and the diagram on the right in the lower row are equivalent to FIG. 11, FIG. 10, FIG. 13B, FIG. 13C, FIG. 14B and FIG. 14C, respectively.

Through the process as shown in FIG. 21, a pattern having target frequency characteristics can be obtained.

<Convolution of Basic Tone Patterns with Respective N Regions in an N-Regions Division Pattern>

The reason why frequency characteristics obtained in the process A-1 are deployed in the periphery of each basic tone frequency in the process A-2, with respect to the description between the process A-1 and the process A-2, will now be described in further detail.

An image divided into N regions (N=2 in this example) in (process A-1) is defined as Gi(x). That is, the image on the left in the upper row of FIG. 21 is Gi(x). The subscript i represents a distinction of N different regions in an N-regions division pattern and takes natural numbers between 1 and N. For example, when N=2, G1 with i=1 represents the black part in a pattern and G2 with i=2 represents the white part in the pattern.

A convolution image, which is embedded in Gi(x) divided into N regions, is defined as pi(x). In this example, the two checkered patterns (staggered image) 1A, 1B having different phases described in FIG. 1 correspond to pi(x).

A pattern image obtained in (process A-2), that is, the image shown on the left in the middle row of FIG. 21 is defined as I(x), so that I(x) with i={1,2} (distinction of N different regions) is expressed as follows:

$$I(x) = \sum_i G_i(x) p_i(x) \quad \text{[Expression 6]}$$

A Fourier transform is performed on this (that is, to be projected in a virtual space) to obtain the following expression.

$$F[I] = \sum_{k'} \sum_i G_i(k-k') p_i(k') \quad \text{[Expression 7]}$$

Since pi(k) shows the local maximum at each basic tone frequency and has little components in the area other than basic tone frequencies, pi(k) can be approximated as follows using the delta function δ(x).

$$p_i(k) \approx \sum_s a_s \delta(k-s) \quad \text{[Expression 8]}$$

Where s is a basic tone frequency. Substitution of [Expression 8] into [Expression 7] yields the following expression F[I], i.e. the FFT image shown on the right in the middle-row of FIG. 21.

$$F[I] = \sum_{k'} \sum_i G_i(k-k') p_i(k') \quad \text{[Expression 9]}$$
$$\approx \sum_{k'} \sum_i G_i(k-k') \sum_s a_s \delta(k'-s)$$
$$= \sum_s \sum_i a_s G_i(k-s')$$

Incidentally, the image on the left in the upper row of FIG. 21 is expressed as follows:

$$F[G] = F\left[\sum_i G_i(x)\right] = \sum_i G_i(k) \quad \text{[Expression 10]}$$

When [Expression 9] and [Expression 10] are compared, it is understood that [Expression 9] has characteristics of [Expression 10] shifted by [s']. In other words, there is a shift of the basic tone frequency [s'] in characteristics between the image on the right in the middle-row of FIG. 21 formulated by [Expression 9] and the image on the right in the upper-row of FIG. 21 formulated by [Expression 10]. This demonstrates that the frequency characteristics of the neighborhood of the original point in the image on the right in the upper-row of FIG. 21 is deployed in the neighborhood of each basic tone frequency (four corners) in the image on the right in the middle-row.

<Configuration of an Apparatus for Creating a Pattern According to the Embodiment>

Figure 22:
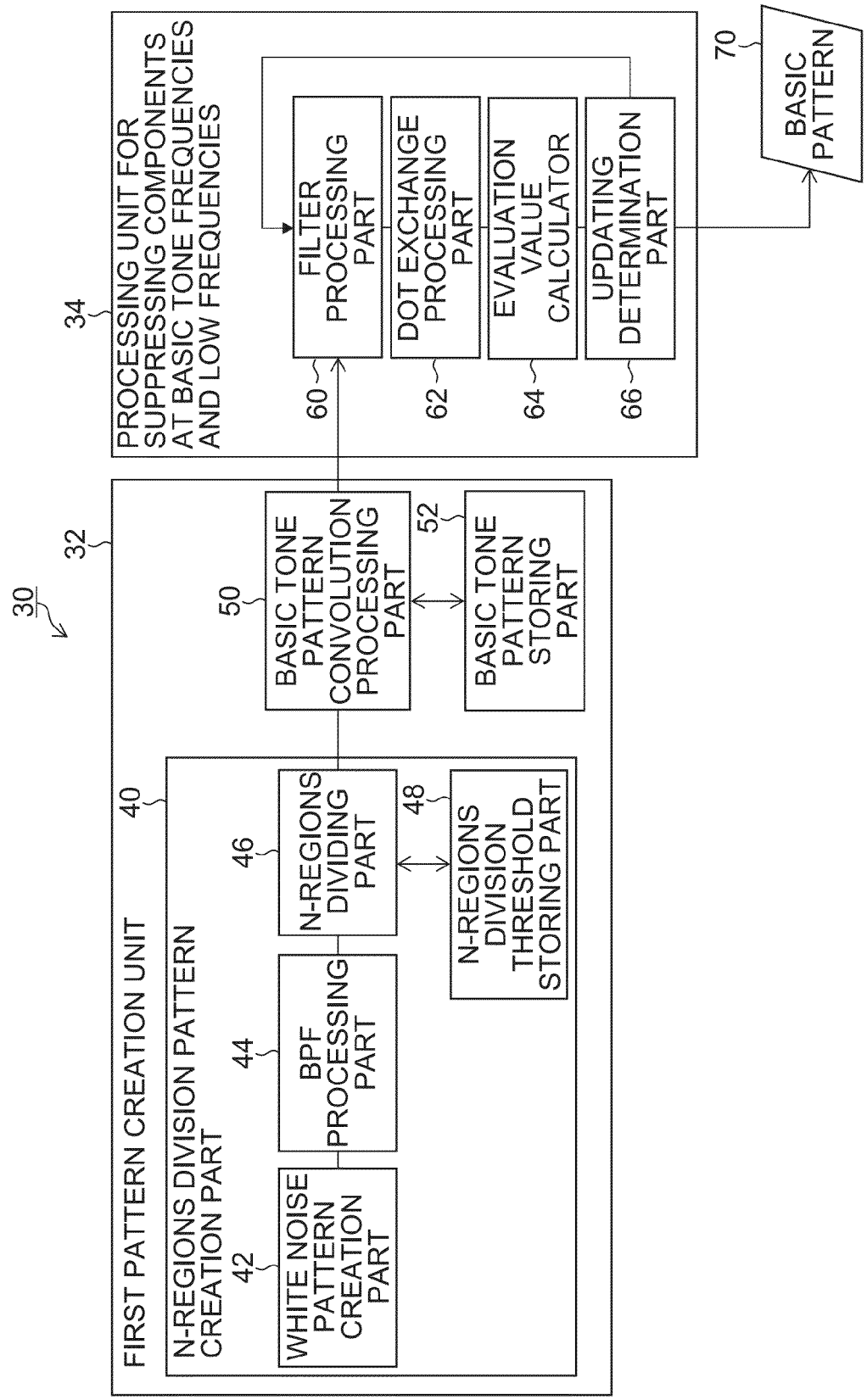
FIG. 22 is a block diagram illustrating a configuration example of an apparatus for creating a pattern in accordance with an embodiment of the present invention.

FIG. 22 is a block diagram illustrating a configuration example of an apparatus capable of creating a pattern (basic pattern) having the pattern characteristics described in FIGS. 5 and 6.

A pattern creating apparatus 30 includes a first pattern creation unit 32 and a pattern optimization processing unit 34 (a processing unit for suppressing components at basic tone frequencies and low frequencies) for changing the pattern of a first pattern created by the first pattern creation unit 32 so as to suppress components at basic tone frequencies and low frequencies in the first pattern.

The first pattern creation unit 32 includes an N-regions division pattern creation part 40, a basic tone pattern convolution processing part 50 and a basic tone pattern storing part 52. The N-regions division pattern creation part 40 includes a white noise pattern creation part 42, a band-pass filter (BPF) processing part 44, an N-regions dividing part 46 and an N-regions division threshold storing part 48. The processing unit 34 for suppressing components at basic tone frequencies and low frequencies includes a filter processing part 60, a dot exchange processing part 62, an evaluation value calculator 64, and an updating determination part 66.

The first pattern creation unit 32 performs processing for creating a first pattern as described in the step S10 of FIG. 8. The processing unit 34 for suppressing components at basic tone frequencies and low frequencies performs optimization of a pattern as described in the step S20 of FIG. 8.

The N-regions division pattern creation part 40 of FIG. 22 performs processing described in the steps S11 to S13 of FIG. 12. The white noise pattern creation part 42 of FIG. 22 performs processing for creating a white noise pattern as described in the step S11 of FIG. 12. The band-pass filter processing part 44 of FIG. 22 performs processing described in the step S12 of FIG. 12. The N-regions division threshold storing part 48 of FIG. 22 stores N−1 threshold levels described in the step S13 of FIG. 12. The N-regions dividing part 46 of FIG. 22 performs processing described in the step S13 of FIG. 12 by applying N−1 threshold levels stored in the N-regions division threshold storing part 48.

The basic tone pattern storing part 52 of FIG. 22 stores N different basic patterns. The basic tone pattern convolution processing part 50 performs convolution of different basic tone patterns with respective N regions in an N-regions division pattern created by the N-regions dividing part 46 so as to perform processing described in the step S14 of FIG. 12. The filter processing part 60 of FIG. 22 performs filter processing described in the step S22 of either FIG. 15 or FIG. 19. The dot exchange processing part 62 of FIG. 22 performs processing described in the step S24 of FIG. 15 or in the step S24A of FIG. 19. The evaluation value calculator 64 of FIG. 22 calculates an evaluation value as described in the step S26 of either FIG. 15 or FIG. 19. The updating determination part 66 of FIG. 22 performs processing for updating a pattern as described in the steps S28 to S32 of either FIG. 15 or FIG. 19.

The processing unit 34 for suppressing components at basic tone frequencies and low frequencies repeats the process described either in FIG. 15 or FIG. 19 a plurality of times to optimize the pattern so that a basic pattern 70 is created (refer to FIG. 22). Thus, the basic pattern 70 created ultimately has the characteristics described in FIGS. 5 and 6.

<Quantization Processing>

Through the undergoing of the processes A and B described above, a pattern having desired characteristics (FIG. 2 as an example) for one gray level (equivalent to a record ratio of 50%) is created. The pattern is designated as a "basic pattern". To convert (quantize) a continuous-tone image to a binary or multi-level dot image, the "basic pattern" described above is used. To make a multi-level quantized pattern (dot image), the amounts of droplets corresponding to respective multiple levels may vary with the type of a recording medium for use in printing (paper type).

Concrete Example 1 of Quantization

Threshold Matrix Method

In the first example of quantization, a threshold matrix (also called a "dither matrix") is used. A threshold arrangement is determined by taking the above-mentioned basic pattern as a dot arrangement candidate.

Japanese Patent No. 4143560 discloses a method for making a threshold matrix by taking a binary image having values corresponding to a halftone ratio of 50% as a dot arrangement candidate. A threshold matrix may be made based on the basic pattern 70 using the method described in Japanese Patent No. 4143560.

<Method for Determining a Pattern with a Record Ratio Between 0 and 50%>

First, a method for making a dot image corresponding to a gradation range with a record ratio between 0% and 50%. Determination of a dot arrangement corresponding to each gray level of an input image enables the creation of a threshold matrix which achieves such a dot arrangement at each gray level, thus determining a dot arrangement (dot image) corresponding to each gray level value and making a threshold matrix are practically identical.

<<Method for Determining a Pattern Corresponding to the Minimum Gray Level Value>>

First, freely arrange dots as many as the number corresponding to the minimum gray level value in the dot-on portions (dot-on pixel portions shown in black in FIG. 2, hereinafter referred to as "on portions") of a basic pattern created through the above-mentioned process A, B.

The minimum gray level value described here is the smallest gray level value L1 except for "L0" having no dot among discrete values (L0, L1, . . . Lmax) that can be taken as a gray level value L in a continuous-tone image. For example, when a gradation is expressed in 8 bits (0-255), the correspondences can be L0=0, L1=1, L2=2, . . . , Lmax=255. In the case of a matrix size with p rows ans q columns and 256 gray levels, the number of dots corresponding to the minimum gray level value Lmin=1 can be, for example, defined as p×q/256.

After that, perform dot exchange processing only in the on portions of the basic pattern. The dot exchange processing is the same as the process described in FIGS. 15 and 19. The difference is that candidates that undergo the dot exchange processing are under the constraint of the basic pattern (the constraint that dots can be arranged only in the on portions of the basic pattern).

It is preferable that the filter of [Expression 5] be used for the dot selection filter in like manner with the step S22 of FIG. 19. Parameters for use may be changed from those for the creation of the basic pattern.

Repeat the dot exchange processing to create a pattern corresponding to the minimum gray level value.

<<Method for Determining a Pattern Corresponding to a Value of One Plus the Minimum Gray Level>>

A method for creating a pattern corresponding to L2 of "+1 gray level" with respect to the minimum gray level value L1: Arrange a predetermined number of new dots in the on portions of the basic pattern in addition to the dots already arranged in the dot arrangement corresponding to the minimum gray level value.

The "predetermined number" is the number of dots determined with an intention that how many dots need to be increased to achieve a density increase in relation to a "+1" increase in gray level.

As a simplest example, in the case of a matrix size with p rows ans q columns and 256 gray levels, the number of dots corresponding to a "+1" increase in gray level can be, for example, defined as p×q/256.

Then, repeat the dot exchange processing in like manner with FIGS. 15 and 19 only on the newly arranged dots so as to optimize the dot pattern corresponding to the gray level.

Repeat the same processing on the subsequent gray levels L3, L4 . . . in sequence so that optimized patterns corresponding to the respective gray levels can be created. This provides optimized patterns corresponding to respective gray levels lower than or equal to a gray level Ls which correspond to the basic pattern with a record ratio of 50%.

<Method for Determining a Pattern with a Record Ratio of Greater than 50% and Up to 100%>

To create a dot pattern corresponding to gray levels with a record ratio of more than 50%, perform the same method as that for a record ratio between 0 and 50% under the constraint that dots are added in the off portions of the basic pattern.

This provides patterns corresponding to all the respective gray levels.

Relationships determined between patterns and their respective gray levels permit the acquisition of a threshold matrix.

A comparison of the threshold matrix created above with the continuous-tone image (input image) enables quandization.

Figure 23:
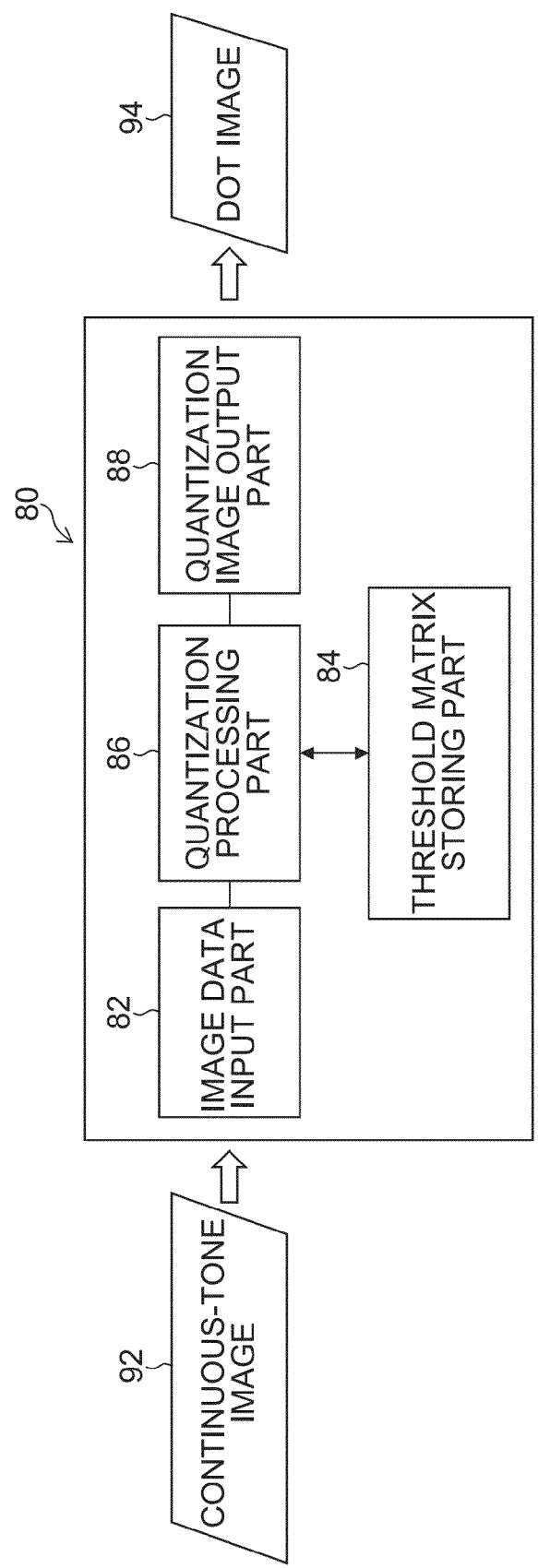
FIG. 23 is a block diagram illustrating a configuration example of an image processing apparatus in accordance with an embodiment of the present invention.

FIG. 23 is a block diagram illustrating a configuration example of an image processing apparatus capable of processing quantization by the use of a threshold matrix. An image processing apparatus 80 includes an image data input part 82 (equivalent to an "image input part"), a threshold matrix storing part 84, a quantization processing part 86 and a quantization image output part 88. The image data input part 82 is an image input part for capturing a continuous-tone image 92 (equivalent to "first image data") which is subject to processing.

The image data input part 82 acts as a data acquisition part for capturing image data. The image data input part 82 can be composed of a data input terminal that captures image data from another signal processing part outside or inside the apparatus. The image data input part 82 may be equipped with a wired or wireless communication interface, may be equipped with a media interface for reading and writing on an external storage medium (removable disk) such as a memory card or may be an appropriate combination of these modes.

The threshold matrix storing part 84 stores threshold matrix data acquired by the use of a basic pattern. The quantization processing part 86 refers to threshold matrix data stored in the threshold matrix storing part 84 so as to quantize an input image.

The quantization image output part 88 outputs a dot image 94 (equivalent to "second image data") of a quantized pattern created by the quantization processing part 86.

The quantization image output part 88 can be a communication interface, a media interface for reading on an external storage medium such as a memory card, an output terminal for image signals or another among a variety of forms.

Concrete Example 2 of Quantization

Error Diffusion Method

In another method of quantization, an error diffusion method is applied with the use of a basic pattern as a constraint for dot arrangement.

For example, for a specific gray level or below, elements corresponding to "off" portions of the basic pattern are set to off and only elements corresponding to "on portions" of the basic pattern are determined to off or on by an error diffusion method. Also, for a specific gray level or above, elements corresponding to "on portions" of the basic pattern are definitely set to "on" and elements corresponding to "off" portions of the basic pattern are determined to off or on by an error diffusion method. The "specific gray level" referred to here can be a gray level corresponding to the basic pattern.

Figure 24:
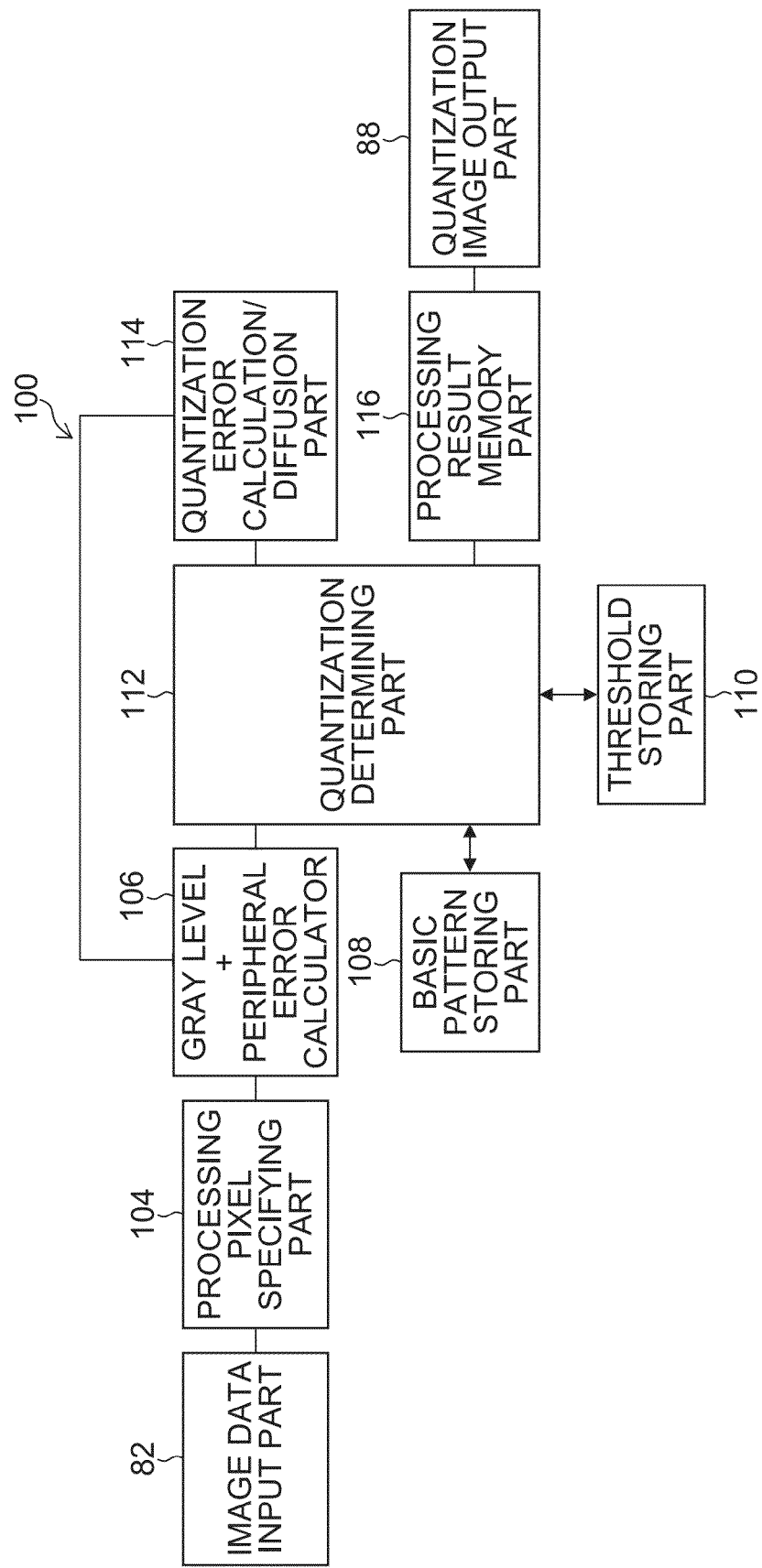
FIG. 24 is a block diagram illustrating a configuration example of an image processing apparatus in accordance with another embodiment of the present invention.

FIG. 24 is a block diagram illustrating a configuration of an image processing apparatus capable of processing quantization by an error diffusion method with the use of a basic pattern as a constraint.

In an image processing apparatus 100 shown in FIG. 24, components identical or similar to those of FIG. 23 are assigned with the same reference numerals, and their descriptions are omitted.

The image processing apparatus 100 of FIG. 24 includes an image data input part 82; a processing pixel specifying part 104 that specifies pixels (processing pixels) subject to quantization processing in an input image data; a calculator 106 that adds up the gray level of a processing pixel and a cumulative value of diffused quantization errors on the peripheral quantized pixels (expressed as "gray level+peripheral error calculator" in FIG. 24); a basic pattern storing part 108 that stores data on a basic pattern used as a constraint for dot arrangement; a threshold storing part 110 that stores threshold levels for determining quantization; a quantization determining part 112 that compares a value obtained by the calculator 106 with the threshold levels for determining quantization (also called "thresholds for error diffusion") and quantizes pixel values so as to meet the constraint of the basic pattern; a quantization error calculation/diffusion part 114 that calculates quantization errors to diffuse them into not-yet-processed pixels in the periphery of a processing pixel; a processing result memory part 116 that stores quantization results; and a quantization image output part 88 that outputs quantized images produced by quantization processing. The quantization determining part 112 acts as a "quantization processor".

Figure 25:
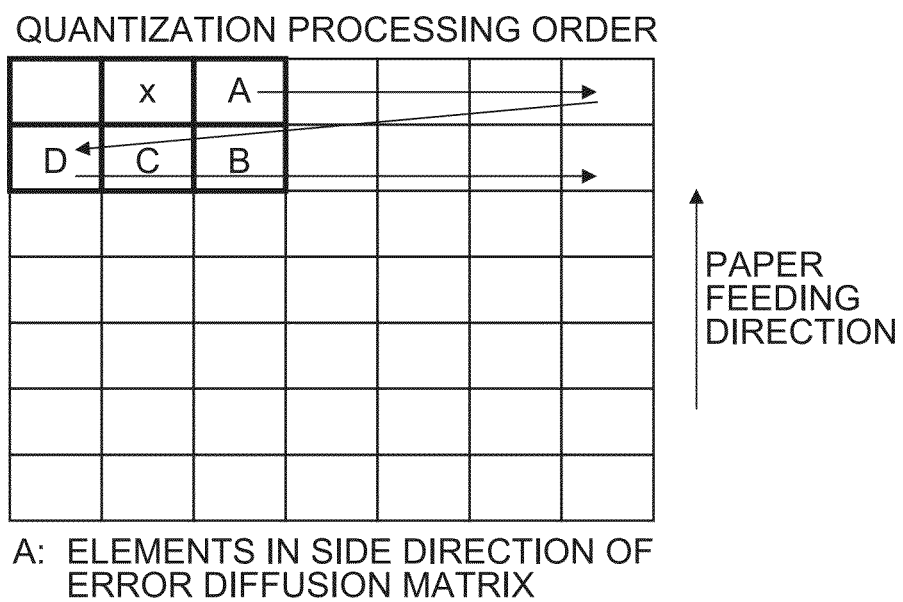
FIG. 25 shows an example of a matrix for error diffusion.

FIG. 25 shows an example of an error diffusion matrix used by the quantization error calculation/diffusion part 114. In FIG. 25, "x" represents the position of a pixel subject to quantization and arrows represent an order in which quantization is processed. Quantization errors are distributed to each of four not-yet-processed pixels (right, lower right, immediately underneath, lower left) adjacent to a pixel of interest (quantization target pixel x). Error diffusion matrix elements A to D that specify an error distribution ratio can be set to appropriate values. When diffused uniformly, for example, errors are divided into 4 equal parts, thus the distribution ratio is ¼ each.

The threshold matrix described in the example 1 may be used as a basic pattern used as a constraint for quantization by the error diffusion method.

Concrete Example 3 of Quantization

Threshold Matrix and Error Diffusion Jointly Used Method

Figure 26:
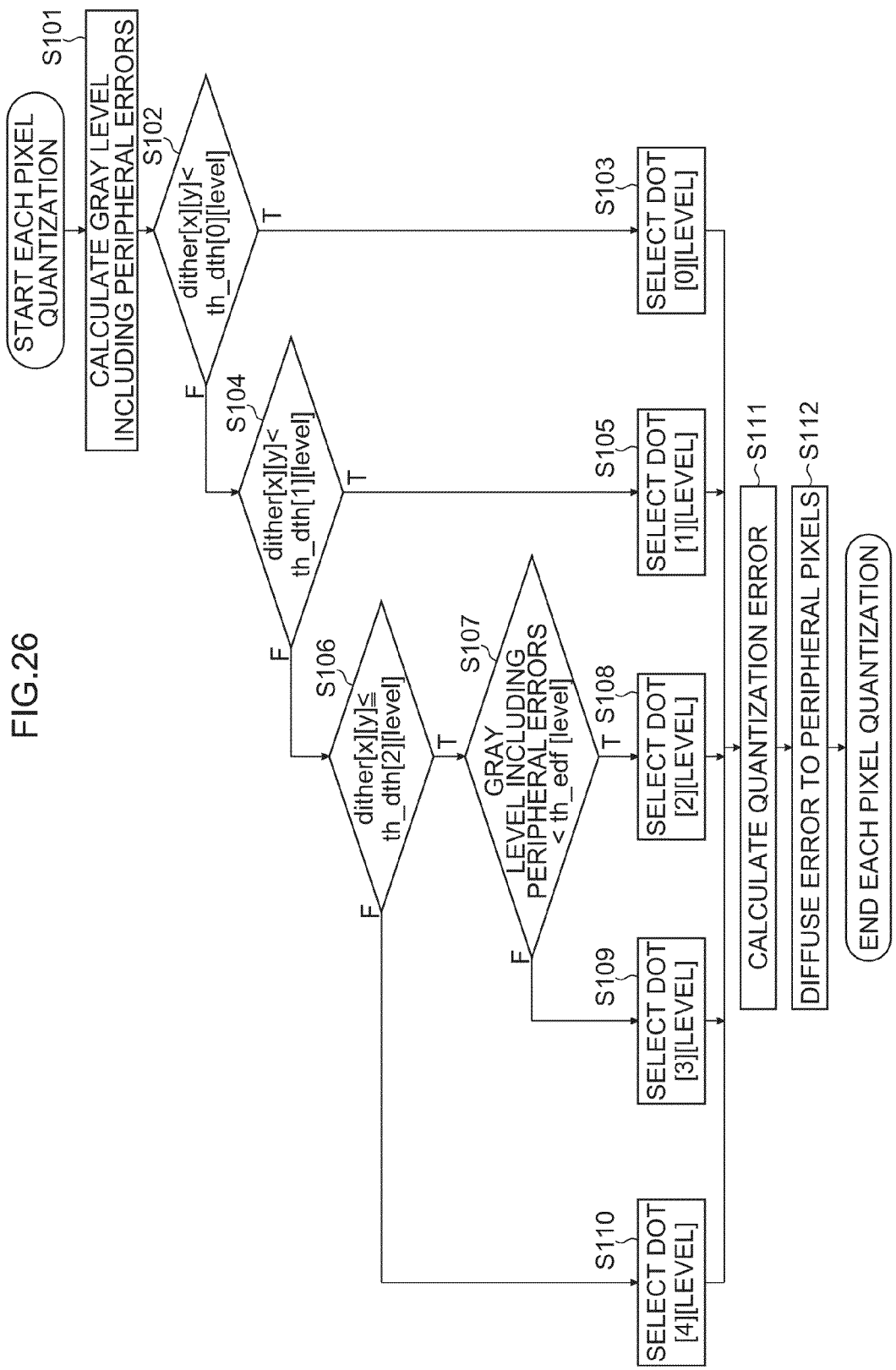
FIG. 26 is a flowchart showing an example of quantization processing in which a threshold matrix and an error diffusion method are jointly used.

FIG. 26 shows a flowchart of quantization processing in which a threshold matrix and an error diffusion method are jointly used. In FIG. 26, dither[x][y] represents a value (elements) at a position (x, y) in a threshold matrix. th_dth[i][level] represents a threshold-dependent value for comparison with the threshold matrix (a threshold for comparison with the threshold matrix) (i=0,1,2). th_edf[level] represents an error diffusion threshold. dot[j][level] corresponds to one of dot sizes {no droplet, small drop, middle drop, large drop} depending on the gray level (j=0,1,2,3).

At the start of quantization processing at each pixel shown in FIG. 26, the process adds up the original gray level of a target pixel and peripheral errors diffused from the target pixel by error diffusion so as to calculate a gray level including the peripheral errors (step S101).

The process compares the value in the threshold matrix (dither[x][y]) with the threshold th_dth[i][level] to divide the image into regions. The threshold th_dth[i][level] is defined for every gray level of a target pixel and stored in a predetermined memory beforehand. In this example, the image is divided into 4 regions using a first threshold th_dth[0][level], a second threshold th_dth[1][level] and a third threshold th_dth[2][level].

First, the process compares the value in the threshold matrix with the first threshold th_dth[0][level] (step S102). When the result shows that the value in the threshold matrix is smaller, the dot size specified by dot[0][level] is selected (step S103).

If the value in the threshold matrix is greater than or equal to the first threshold in the step S102, the process compares the value in the threshold matrix with the second threshold th_dth[1][level] (step S104). When the result shows that the value in the threshold matrix is smaller, the dot size specified by dot[1][level] is selected (step S105).

If the value in the threshold matrix is greater than or equal to the second threshold in the step S104, the process further compares the value in the threshold matrix with the third threshold th_dth[2][level] (step S106). When the value in the threshold matrix is smaller than or equal to the third threshold th_dth[2][level], the process goes to step S107 in which a comparison between the gray level including the peripheral errors and the error diffusion threshold th_edf[level] is made (step S107). The error diffusion threshold th_edf[level] is also defined for every gray level of a target pixel and stored in a predetermined memory beforehand. When the result in the step S107 shows that the gray level including the peripheral errors is smaller than the error diffusion threshold, the dot size specified by dot[2][level] is selected (step S108).

If the gray level including the peripheral errors is greater than or equal to the error diffusion threshold in the step S107, the dot size specified by dot[3][level] is selected (step S109). As described above, a region in which the dither threshold is smaller than or equal to the third threshold (and greater than or equal to the second threshold) is binarized by an error diffusion method.

If the value in the threshold matrix is greater than the third threshold in the step S106, the dot size specified by dot[4][level] is selected (step S110).

A dot size corresponding to each dot[j][level] can be appropriately defined for each gray level. dot[0][level], dot[1][level], dot[2][level], dot[3][level], and dot[4][level] for certain gray levels can be defined, for example, to small drop, middle drop, no droplet, large drop, and large drop, respectively. It is essential only that dot[3][level]>dot[2][level] should be satisfied, and each value is defined so that large dots are placed for a large quantization error and small dots are placed for a small quantization error.

After a dot size is selected for the target pixel as described above, a quantization error is calculated (step S111). The quantization error is an error that occurs when the gray level including the peripheral errors is quantized and a difference between the gray level including the peripheral pixels and a quantization threshold. The quantization threshold is each of gray levels corresponding to respective dot[0][level], dot[1][level], dot[2][level], dot[3][level], and dot[4][level].

The calculated quantization error is diffused to the peripheral pixels according to a predetermined error diffusion matrix (refer to FIG. 25) (step S112). Subsequently, the process shifts its target pixel for quantization to an adjacent pixel and performs the same processing on it so that all the pixels are quantized.

The quantization processing described above determines respective record ratios of different regions having dot[0][level], dot[1][level] and dot[4][level], respectively, corresponding to the steps S103, S105 and S110 according to the threshold matrix and determines record ratios for the other regions by binarization with the use of the error diffusion method (steps S108 and S109). Processing quantization in this manner allows record ratios with 4 levels to be uniquely determined gray level by gray level.

Although this example uses a threshold which depends on the original gray level of a target pixel for each threshold th_dth[i][level], a threshold which depends on the gray level including the peripheral errors may be used.

Figure 27:
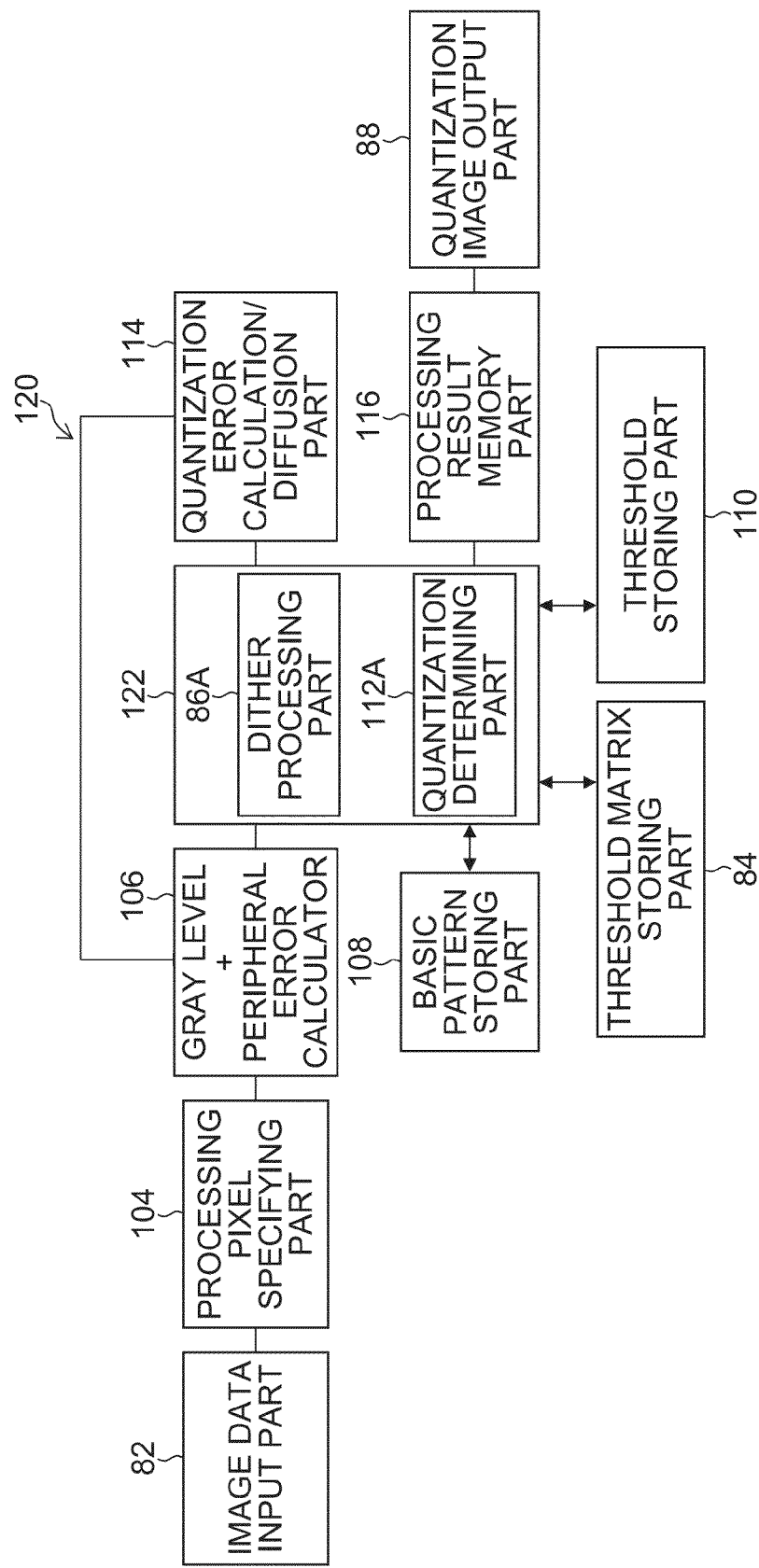
FIG. 27 is a block diagram illustrating a configuration example of an image processing apparatus in accordance with another embodiment of the present invention.

FIG. 27 is a block diagram illustrating a configuration of an image processing apparatus capable of processing quantization by the combined use of a threshold matrix and error diffusion as described in FIG. 26. In the configuration of FIG. 27, components identical or similar to those of FIGS. 23 and 24 are assigned with the same reference numerals, and their descriptions are omitted.

A quantization processing part 122 of an image processing apparatus 120 in FIG. 27 includes a dither processing part 86A that performs quantization using a threshold matrix; and a quantization determining part 112A that performs quantization by applying thresholds for error diffusion. The image processing apparatus 120 processes quantization according to the flowchart described in FIG. 26.

As described above, quantization with the use of a basic pattern provides high frequent occurrence of basic tone patterns and a mostly uniform-distributed quantized pattern. This allows both the expansion of the color reproduction region and the suppression of artifacts.

<Pattern Creating Apparatus and Image Processing Apparatuses in the Embodiments>

Functions of various components in the pattern creating apparatus 30, the image processing apparatus 80, the image processing apparatus 100 and the image processing apparatus 120 exemplified in FIGS. 22, 23, 24 and 27, respectively, can be implemented by hardware such as a computer and an integrated circuit or software (program) that effects the operation of a central processing unit (CPU) and the like, or an appropriate combination of these.

In other words, functions of various components in the pattern creating apparatus 30, the image processing apparatuses 80, 100, and 120 or each step of the processes described in FIGS. 8, 12, 15, 19 and 26, according to the embodiments, can be performed by computers. Programs for letting the computer perform the processes and the functions described in the embodiments may be installed in the computer beforehand or may be provided through a non-transitory recording medium such as a magnetic disk, an optical disc, a magneto-optical disk, a memory card or another computer-readable recording medium (a data storage medium) that stores the programs (or computer-readable codes of the programs). In addition, instead of the form of providing programs through such a tangible object i.e. a storage medium, program signals may be provided as a download service through a communication network like the Internet.

<Definition and Constraint for N when an N-Regions Division Pattern is Created>

Although the embodiments described above used the checkered patterns 1A, 1B of FIG. 1 as basic tone patterns for the sake of simple explanation, embodiments of the present invention are not limited to the examples.

Different patterns convoluted (embedded) in the respective regions of a pattern divided into N regions by the "process A" for creating a basic pattern show identical densities per unit area and have a difference in phase (phase of a spatial cycle of dot arrangement) or/and basic tone frequency, one to the other.

N of N regions represents the number of different pattern (basic tone pattern) types used for convolutions. In the case of the embodiments using the checkered patterns 1A, 1B exemplified in FIG. 1, N=2 because two different patterns are used.

Figure 28:
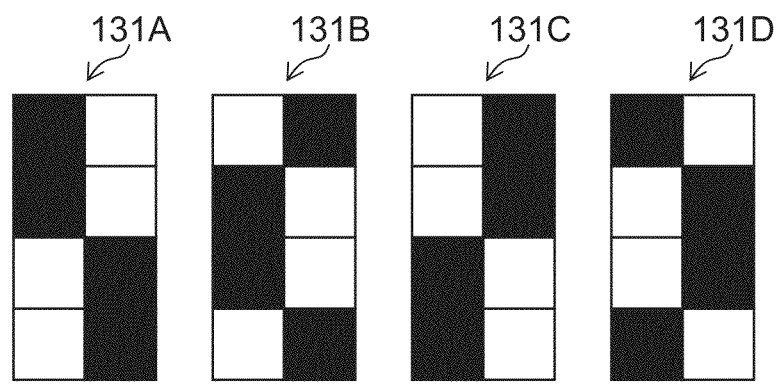
FIG. 28 illustrates other examples of a basic tone pattern.

For example, other embodiments using the four different patterns 131A to 131D of FIG. 28 can be supposed. N=4 when all the four types are used, and N=3 when only three are selected among these.

These N (N types) patterns show identical densities per unit area and have a difference in phase or/and basic tone frequency, one to the other.

A density per unit area for all the patterns (1A, 1B, 131A to 131D) shown in FIGS. 1 and 28 is 50%. Thus, 2 to 6 types can be freely selected among these 6 types.

(Basic Tone Frequency)

The basic tone frequency is a local maximum obtained when a frequency analysis is performed on a pattern in which different basic tone patterns are convoluted with the N respective regions of the pattern. The basic tone patterns are repeatedly arranged until the size of the convoluted pattern reaches the size of the original pattern undergoing the convolution. The basic tone pattern corresponds to a "specific pattern".

Example 1

Figure 29:
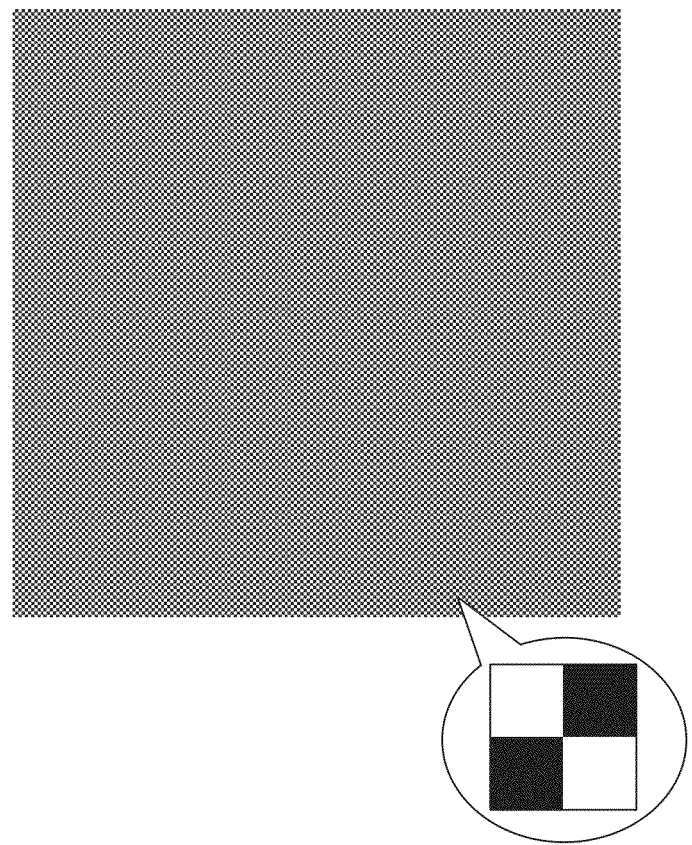
FIG. 29 illustrates a checkered pattern image in a real space.
Figure 30:
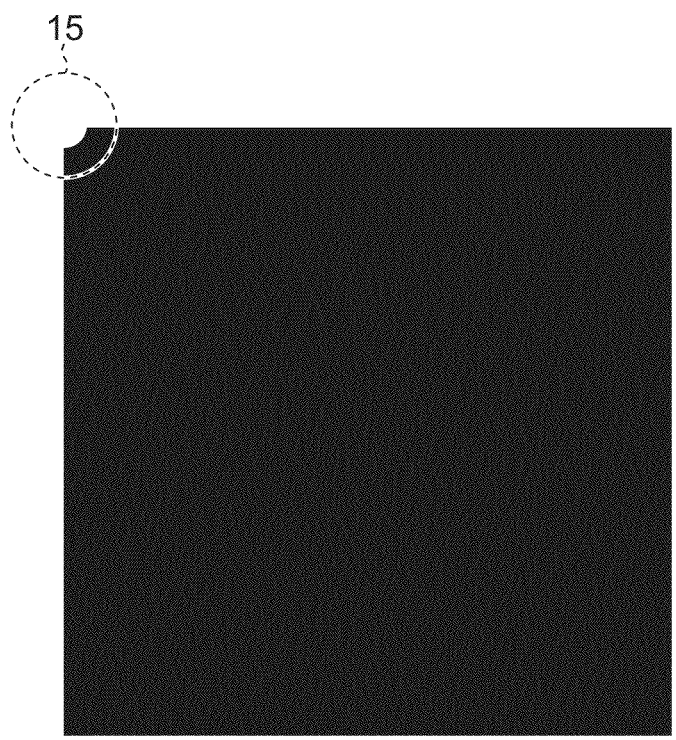
FIG. 30 illustrates an image obtained when a fast Fourier transform (FFT) is performed on the image of FIG. 29.

FIG. 29 shows an image of a pattern in a real space (a checkered pattern image in real space) wherein the pattern has an arrangement of repeating checkered patterns; and FIG. 30 is a fast Fourier transformed (FFT) image obtained when a fast Fourier transform (FFT) is performed on a checkered pattern image in a real space. Since FIG. 30 is an FFT image, each side of the FFT image has repeatability and thus each side adjoins another identical image (not shown).

The component amounts of frequencies in an FFT image are represented by brightness, and black indicates "0" component while white indicates a large component. In the FFT image of FIG. 30, the basic tone frequency of the checkered patterns is shown at the "white portion" in the upper left corner area enclosed in the dashed-line circle 15.

Example 2

Figure 31:
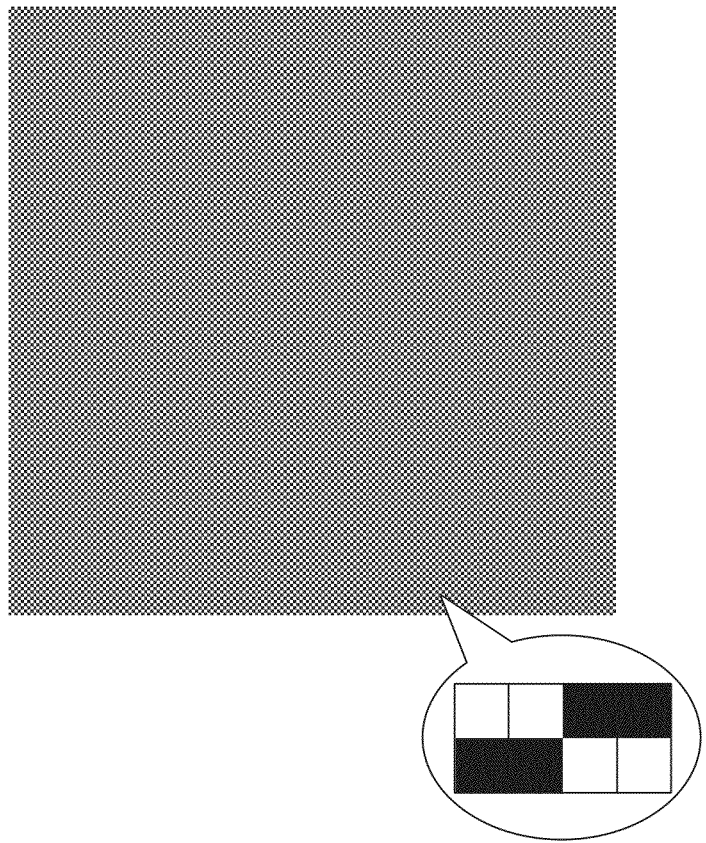
FIG. 31 illustrates a 1-by 2-pixel checkered pattern image in a real space.
Figure 32:
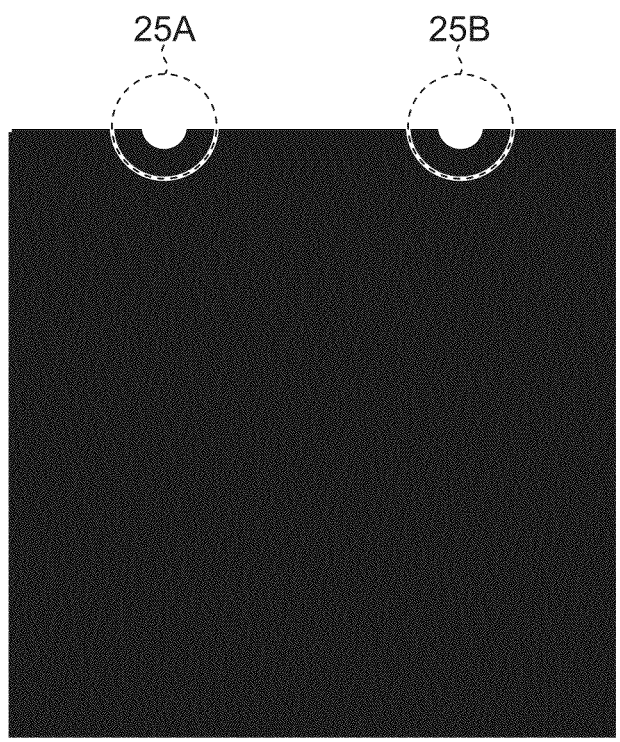
FIG. 32 illustrates an image obtained when a FFT is performed on the image of FIG. 31.

FIG. 31 shows a checkered pattern in which a 1-by 2-pixel unit is the minimum unit for the white portion or the black portion. FIG. 31 presents a pattern in which the pattern 131A shown at the most left of FIG. 28 is repeatedly arranged. FIG. 32 is an FFT image obtained when a fast Fourier transform is performed on the real space image of FIG. 31. The pattern of FIG. 31 has two basic tone frequencies shown at the white portions in the dashed-line circles 25A, 25B of FIG. 32.

Example 3

When the checkered pattern of the example 1 and the 1-by 2-pixel checkered pattern of the example 2 are combined, there exists a total of three basic tone frequencies composed of the basic tone frequency of the checkered pattern of the example 1 (one) and the basic tone frequencies of the example 2 (two).

<Configuration of Inkjet Recording Apparatus>

Figure 33:
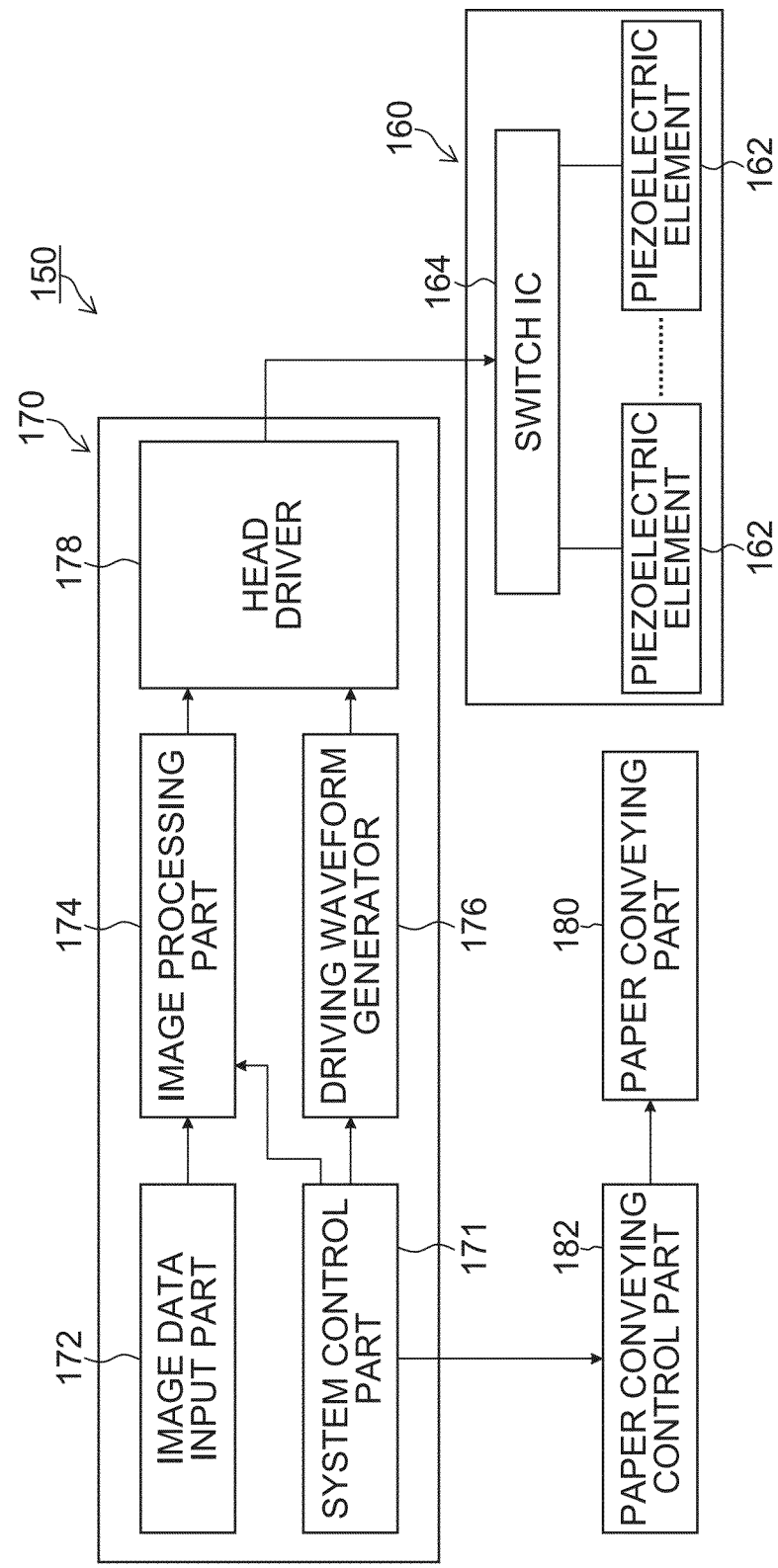
FIG. 33 is a block diagram illustrating essential components of an inkjet recording apparatus.

FIG. 33 is a block diagram illustrating an essential configuration of an inkjet recording apparatus that includes an image processing apparatus in accordance with an embodiment of the present invention. An inkjet recording apparatus 150 includes a recording head 160, a control unit 170 (equivalent to a "control device") that controls recording performed by the recording head 160, and a paper conveying part 180 (equivalent to a relative moving device"). Although the recording head 160 described here is fit for a single color for the sake of simple illustration, the inkjet recording apparatus 150 includes a plurality of inkjet heads corresponding to a plurality of respective ink colors.

The recording head 160, though shown schematically, includes a plurality of piezoelectric elements 162, each of which acts as a discharge energy generating element so as to generate energy needed for discharging ink in relation to each nozzle, and a switch IC 164 for switching between driving/non-driving each of the piezoelectric elements 162.

The number of nozzles, the density and the arrangement of nozzles in the recording head 160 are not particularly limited and various forms may be adopted. For example, to achieve a designated recording resolution in a main scanning direction, a one-dimensional nozzle arrangement in which a large number of nozzles are arranged in a straight line (single row) at regular intervals may be used, or a so-called staggered arrangement in which two nozzle rows are displaced half a pitch the pitch of nozzles (a nozzle-to-nozzle pitch) in a nozzle row direction with respect to each other may be used. In addition, to achieve a further high recording resolution, the arrangement can be, for example, a matrix in which three or more nozzle rows are arranged, i.e. a large number of nozzles are two-dimensionally arranged on an ink discharge surface (nozzle surface).

In the case of an inkjet head having a two-dimensional nozzle arrangement, a projection nozzle row in which each nozzle is projected (orthogonal projection) so as to arrange each nozzle along the direction of paper width (equivalent to a main scanning direction) in the two-dimensional nozzle arrangement can be thought of equivalent to a single nozzle row in which nozzles are arranged generally at regular intervals in a main scanning direction (medium width direction) with a nozzle density which allows the achievement of a recording resolution. The "regular intervals" described here represent practically regular intervals that produce droplet jetted points printable in an inkjet printing system. For example, the concept of "regular intervals" includes a case in which slightly variant intervals are contained with consideration given to the movement of droplets on a medium owing to a margin of error or impact interference. Taking the projection nozzle row (also called a "practical nozzle row") into consideration allows correspondences to be established between the order in which projection nozzles are arranged in a main scanning direction and the positions of nozzles (nozzle numbers). The "nozzle position", if any, described later refers to the position of the nozzle in the practical nozzle row.

The control unit 170 includes a system control part 171, an image data input part 172 that acts as an input interface receiving the original image data of an image to be recorded (multi-level image data), and an image processing part 174 that performs density correction and quantization on an input image data. The control unit 170 further includes a driving waveform generator 176 and a head driver 178.

The image processing part 174 is a signal processing device which converts an input image data to binary or multi-level dot data (quantization data). The image processing apparatuses 80, 100, and 120 can be applied to the image processing part 174.

A mode with the threshold matrix described in FIG. 23, a mode with the error diffusion method described in FIG. 24 and a mode with the combined use of the threshold matrix and error diffusion described in FIGS. 26 and 27 can be used as a quantization processing (halftone processing) device.

The quantization processing generally converts m-level (m: an integer of 3 or greater) image data to n-level (n: an integer of 2 or greater and less than m) image data that has a smaller gray level than m. While the simplest example is conversion into binary dot image data (dots on/off), the quantization processing is also capable of quantizing multi-level values corresponding to different dot sizes (for example, three sizes, i.e. large dots, medium dots, small dots).

Binary or multi-level image data (dot data) generated in the image processing part 174 is used as ink discharge control data (droplet jetting control data) for controlling driving (on)/non-driving (off) of each nozzle and further droplet amount (dot size) in the case of multi-level values. The dot data (droplet jetting control data) generated in the image processing part 174 is fed to the head driver 178 that controls the discharge of ink from the recording head 160.

The driving waveform generator 176 is a device which generates voltage signal waveforms for driving the piezoelectric elements 162 corresponding to respective nozzles of the recording head 160. Driving voltage signal waveform data is stored in a storage device such as ROM beforehand and waveform data for use is output as needed. Signals (waveforms) generated by the driving waveform generator 176 are supplied to the head driver 178. Signals output from the driving waveform generator 176 may be digital waveform data or analog voltage signals.

The inkjet recording apparatus 150 shown in this example employs a driving method for supplying a common driving voltage waveform signal via the switch IC 164 to each of the piezoelectric elements 162 of the recording head 160 and switching on/off of each corresponding switch element connected to each electrode of each of the piezoelectric elements 162 in response to the discharge timing of each of the respective nozzles so as to cause the nozzle corresponding to each of the piezoelectric elements 162 to discharge ink. The recording head 160 discharges a droplet of ink on demand from a driving signal and a discharge control signal given from the head driver 178.

The system control part 171, the image data input part 172 and the image processing part 174 in FIG. 33 constitute the equivalent of an "image processing apparatus".

The system control part 171 controls the paper conveying part 180 through a paper conveying control part 182. This causes paper sheets (recording medium, not shown) to be conveyed to the recording head 160. The paper conveying control part 182 and the paper conveying part 180 are equivalent to a "relative moving device".

Advantages of Embodiments

According to the embodiments of the present invention described above, components in the neighborhood of each basic tone frequency are suppressed and a local maximum occurs in the outer periphery of each basic tone frequency. This permits the acquisition of a pattern that presents high frequent occurrence of basic tone patterns and decreased low-frequency components in the clusters of the basic tone patterns and in the whole pattern. This allows both the expansion of the color reproduction region and the suppression of artifacts.

<Device for Relatively Moving Head and Paper>

Embodiments of the present invention are not limited to the configuration in which the recording medium is conveyed with respect to a stopped recording head as in the embodiments exemplified above, but can use a configuration in which the recording head moves with respect to a stopped recording medium. Although line heads in a single-path system are normally arranged in a direction perpendicular to a recording medium feeding (conveying) direction, a mode in which recording heads are arranged in a direction slanting by a given angle with respect to the direction perpendicular to the conveying direction may be adopted.

The present invention can also be applied to an image forming apparatus in a serial scanning system in which image recording is performed with the recording head scanning in a direction perpendicular to the recording medium conveying direction without limiting its application to a single-path system.

<Recording Media>

The term "recording medium" is a general term for media on which dots are recorded with a recording head and includes terms such as recording medium, printing medium, recorded medium, image-formed medium, receiving medium and discharged medium. The present invention can be applied to various media without limitation in material, form and the like, including continuous roll paper, cut paper, seal sheets, resin sheets and other OHP sheets, films, cloth, nonwoven fabrics, printed circuit boards on which a wiring pattern is formed, and rubber sheets.

<Applicable Apparatuses>

The above-described embodiments have been discussed with examples in which the present invention is applied to an inkjet recording apparatus for graphic printing. The applicability of the present invention, however, is not limited to the examples. The present invention can be applied to a wide variety of inkjet apparatuses that draw various forms and patterns with the use of functional liquid materials, including apparatuses that draw wiring patterns on electronic circuits, apparatuses for manufacturing various devices, resist recording apparatuses that use resin liquid as a functional liquid for discharge, color filter manufacturing apparatuses, and apparatuses for forming microstructures with the use of deposition materials.

<Recording Head Usage Modes Other than Inkjet System>

Although the embodiments in the above explanation show an inkjet recording apparatus as an example of an image forming apparatus using a recording head, the applicability of the present invention is not limited to this. In addition to an inkjet system, the present invention can be applied to image forming apparatuses in various systems that use dot recording, including thermal transfer recording apparatuses equipped with a recording head having thermal elements as recording elements, LED electrophotographic printers equipped with a recording head having LED elements as recording elements and silver halide photographic printers having a LED exposure line head.

It should be understood that appropriate structural modifications, additions and deletions may occur in the embodiments of the present invention described above insofar as they are within the scope of the present invention. Application of the present invention is not limited to the embodiments described above, and it should be understood by those skilled in the art that various alterations may occur insofar as they are within the scope of the present invention.

What is claimed is:

1. a quantization method, comprising the steps of:
quantizing a first image data by use of a basic pattern; and
converting the first image data into a second image data that represents a binary or multi-level quantized pattern having a gray level smaller than that of the first image data,
wherein, when each of basic tone frequencies is a local maximum of spatial frequency components in a pattern image that contains each of basic tone patterns repeatedly arranged as a repeating unit of a specific pattern in a two-dimensional dot arrangement, the basic pattern has spatial frequency characteristics in which components at and in a neighborhood of each basic tone frequency are relatively suppressed in comparison with other spatial frequency components in the pattern image, the local maximum exists in components at an outer periphery of each basic tone frequency outside the neighborhood of each basic tone frequency, and components at low frequencies are suppressed.

2. The quantization method according to claim 1, wherein the basic pattern is created through the steps of:
making a first pattern in which components in the neighborhood of each of the basic tone frequencies are relatively suppressed in comparison with other components and the local maximum of components exists at the outer periphery of each basic tone frequency; and
suppressing lower frequency components than those of the first pattern while maintaining pattern characteristics of the neighborhood and the outer periphery of each basic tone frequency in the first pattern.

3. The quantization method according to claim 2,
wherein the step of making the first pattern includes the steps of:
making a division pattern divided into N different regions (N: 2 or greater), the division pattern having pattern characteristics in which, out of spatial frequency components, low-frequency components lower than a first frequency Fmin and high-frequency components higher than a second frequency Fmax which is higher than the first frequency Fmin are suppressed; and
performing convolution of the respective N regions in the division pattern with N different basic tone patterns having identical densities per unit area and having a difference in at least one of phase and basic tone frequency, one to the other,
wherein the step of suppressing lower frequency components than those of the first pattern includes the step of converting the first pattern made in the convolution step into a second pattern in which respective basic tone frequency components and respective low-frequency components in the N different basic tone patterns are suppressed.

4. The quantization method according to claim 3,
wherein the step of making the division pattern includes the steps of:
applying a band-pass filter for suppressing low-frequency components lower than the first frequency Fmin and high-frequency components higher than the second frequency Fmax to a white noise pattern; and
applying N−1 threshold levels to a pattern resulting from the application of the band-pass filter so as to divide the pattern into the N regions.

5. The quantization method according to claim 2,
wherein the step of suppressing lower frequency components than those of the first pattern includes the steps of:
performing filter processing on a pattern; and
performing an exchange between relatively high density dots and relatively low density non-dots in the pattern, and
wherein the filter processing uses a filter that highlights low-frequency components and components in the neighborhood of each basic tone frequency among other components in the pattern.

6. The quantization method according to claim 2,
wherein the step of suppressing lower frequency components than those of the first pattern is a step for extracting boundary regions including the boundaries of the N regions from the first pattern and changing the arrangement of dots only in the boundary regions.

7. The quantization method according to claim 1, wherein the basic pattern has a record ratio of 50%.

8. The quantization method according to claim 1, wherein the quantization is processed by the use of a threshold matrix created based on the basic pattern.

9. The quantization method according to claim 1, wherein the quantization is processed by an error diffusion method through the use of the basic pattern as a constraint for dot arrangement.

10. An image processing apparatus comprising:
an image input part that captures a first image data; and
a quantization processing part for quantizing the first image data and converting the first image data into a second image data that represents a binary or multi-level quantized pattern having a gray level smaller than that of the first image data,
wherein the quantization processing part quantizes the first image data by use of a basic pattern to convert the first image data into the second image data, and when each of basic tone frequencies is a local maximum of spatial frequency components in a pattern image that contains each of basic tone patterns repeatedly arranged as a repeating unit of a specific pattern in a two-dimensional dot arrangement, the basic pattern has spatial frequency characteristics in which components at and in a neighborhood of each basic tone frequency are relatively suppressed in comparison with other spatial frequency components in the pattern image, the local maximum exists in components at an outer periphery of each basic tone frequency outside the neighborhood of each basic tone frequency, and components at low frequencies are suppressed.

11. The image processing apparatus according to claim 10, further comprising a threshold matrix storing part that stores a threshold matrix created based on the basic pattern,
wherein the quantization processing part processes the quantization by the use of the threshold matrix.

12. The image processing apparatus according to either claim 10, further comprising a basic pattern storing part that stores the basic pattern, wherein the quantization processing part processes the quantization by an error diffusion method through the use of the basic pattern as a constraint for dot arrangement.

13. A non-transitory recording medium in which computer-readable code of a program which causes a computer to perform the quantization method according to claim 1 is stored.

* * * * *